US012772152B2

(12) United States Patent
Liu et al.

(10) Patent No.: US 12,772,152 B2
(45) Date of Patent: Oct. 20, 2026

(54) RESOURCE INFORMATION INDICATION METHOD AND APPARATUS

(71) Applicant: HUAWEI TECHNOLOGIES CO., LTD., Shenzhen (CN)

(72) Inventors: Zhe Liu, Shenzhen (CN); Zheng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 771 days.

(21) Appl. No.: 18/164,960

(22) Filed: Feb. 6, 2023

(65) Prior Publication Data

US 2023/0189129 A1 Jun. 15, 2023

Related U.S. Application Data

(63) Continuation of application No. PCT/CN2020/108019, filed on Aug. 7, 2020.

(51) Int. Cl.
*H04W 4/00* (2018.01)
*H04W 48/10* (2009.01)
*H04W 48/16* (2009.01)

(52) U.S. Cl.
CPC ........... *H04W 48/16* (2013.01); *H04W 48/10* (2013.01)

(58) Field of Classification Search
CPC .............................. H04W 48/10; H04W 48/16
USPC ......................................................... 455/434
See application file for complete search history.

(56) References Cited

U.S. PATENT DOCUMENTS

2017/0013501 A1* 1/2017 Kim ...................... H04W 28/02
2017/0201933 A1* 7/2017 Krishnamoorthy ... H04W 48/18
2017/0251384 A1 8/2017 Peng et al.
2019/0306827 A1* 10/2019 Agiwal ................... H04L 5/001
2020/0077310 A1* 3/2020 Cheng ................... H04W 76/19
(Continued)

FOREIGN PATENT DOCUMENTS

CN 101810035 A 8/2010
CN 108282831 A 7/2018
CN 106605425 B 2/2019
(Continued)

OTHER PUBLICATIONS

R1-1721355, Ericsson, "Summary of 7.3.1.4 (DCI contents and formats)," TSG-RAN WG1 #91, Reno, NV, US, Nov. 27-Dec. 1, 2017; 6 total pages.

*Primary Examiner* — Temica M Beamer
(74) *Attorney, Agent, or Firm* — Rimon PC

(57) ABSTRACT

Embodiments of this application disclose a resource information indication method and related apparatus, and generally relates to the field of communications technologies. A network device determines first indication information and sends first information, where the first information includes the first indication information. A bit state of the first indication information is a bit state in a first state set, and the network device supports a first terminal device in accessing the network device, and/or a bit state of the first information is a bit state in a second state set, and the network device does not support the first terminal device in accessing the network device. In some embodiments, after determining the first indication information, the network device sends the first information, so that the first terminal device can access the network device, and use a resource of the network device.

14 Claims, 4 Drawing Sheets

(56) References Cited

U.S. PATENT DOCUMENTS

2020/0228269 A1* 7/2020 Zhang .................. H04L 5/0073

FOREIGN PATENT DOCUMENTS

CN 111901085 A 11/2020
EP 2903337 A1 8/2015

* cited by examiner

RESOURCE INFORMATION INDICATION METHOD AND APPARATUS

CROSS-REFERENCE TO RELATED APPLICATIONS

This application is a continuation of International Application No. PCT/CN2020/108019, filed on Aug. 7, 2020, the disclosure of which is hereby incorporated by reference in its entirety.

TECHNICAL FIELD

This application generally relates to the field of communications technologies, and in particular, to a resource information indication method and an apparatus.

BACKGROUND

To access a 5th generation mobile communications technology (5G) new radio (NR) network, a terminal device typically needs to perform processes such as cell search, obtaining of system information, and random access, to better receive a communication service in the 5G NR network. Typically, only after obtaining system information of a cell, the terminal device can learn how the cell is configured, to better access the cell and receive a communication service in the cell.

The system information typically includes a master information block (MIB) and a plurality of system information blocks (SIB). In a process of attempting to access a network device, the terminal device receives MIB or SIB information. The network device limits the number of accessed terminal devices, and sends a cell access barred message. Therefore, when the terminal device receives the access barred message, the terminal device does not access the cell. However, in actual application, with this access method, one or more types of terminal devices cannot be flexibly indicated to access a cell, and it cannot be flexibly indicated that other one or more types of terminal devices are barred from accessing the cell.

SUMMARY

This application provides a resource information indication method and an apparatus, to indicate whether a first terminal device is supported in accessing a network device, and indicate a resource to be used by the first terminal device to access the network device.

According to a first aspect, this application provides a resource information indication method, including:

A network device determines first indication information, where a bit state of the first indication information is a bit state in a first state set, and the network device supports a first terminal device in accessing the network device, and/or a bit state of the first information is a bit state in a second state set, and the network device does not support the first terminal device in accessing the network device; and the network device sends first information, where the first information includes the first indication information.

The network device indicates, by using different bit states, whether the first terminal device is supported in accessing the network device. In stating that the network device supports a first terminal device in accessing the network device in this application is to mean that the network device is capable of supporting the terminal device in accessing the network device, or the network device allows the terminal device to access the network device. The first indication information may include one or more bits. There may be one or more bit states in the first state set, and there may be one or more bit states in the second state set. The number of bits in the first state set is the same as the number of bits in the second state set. For example, if the bit state in the first state set includes 1 bit, the bit state in the second state set also includes 1 bit. Compared with conventional technology, in which indication information used to indicate the first terminal device to access the network device is not provided, the solutions provided in this application are more applicable to a load balancing requirement existing when the first terminal device accesses the network device.

In a possible implementation, the first information includes a master information block (MIB) sent by the network device.

In this application, the first information includes the master information block, so that the network device may send the first indication information by using the master information block.

In a possible implementation, the master information block further includes second indication information, the second indication information is cellBarred information, and the cellBarred information is not applied to the first terminal device.

When the first information includes the master information block sent by the network device, the master information block further includes the second indication information. The second indication information may be the cellBarred information, and the cellBarred information is usually not used to determine whether the network device supports access of the first terminal device.

In this application, that the second indication information is not applied to the first terminal device may be understood as that when a state of the second indication information is that access to the network device is not supported, the state is invalid for the first terminal device. Therefore, whether the network device supports the first terminal device in accessing the network device can be independently controlled.

In a possible implementation, the first information includes downlink control information (DCI) or a system information block (SIB) sent by the network device.

In this application, the first information includes the downlink control information or the system information block. A downlink shared channel scheduled by using the downlink control information carries the system information block, and the network device may send the first indication information by using the downlink control information or the system information block. There are a relatively large number of reserved bits, namely, available bits, in the downlink control information or the system information block, and therefore sending of the first indication information is further facilitated.

In a possible implementation, before the network device sends the first information, the method further includes: the network device sends a master information block to the first terminal device, where the master information block includes cellBarred information, and the cellBarred information is not applied to the first terminal device.

In this application, before sending the first information, the network device sends the master information block. The first information is downlink control information or a system information block. The master information block is sent before the first information is sent, the master information block includes the cellBarred information, and the cellBarred information is not applied to the first terminal device, in other words, content indicated in the cellBarred information is invalid for the first terminal device. Therefore, whether the network device supports the first terminal device in accessing the network device can be independently controlled.

In a possible implementation, the network device sends third indication information used to indicate a broadcast channel type, where a state of the third indication information is 0, and the first information is a master information block included on a broadcast channel; or a state of the third indication information is 1, and the first information is an extended information block included on a broadcast channel; and the extended information block does not include cellBarred information, and/or the extended information block includes fourth indication information.

In this application, the extended information block may be an information block dedicated to the first terminal device. The information block includes one or more bits, or includes one or more pieces of information. For example, the extended information block does not include the cellBarred information, and the extended information block includes the fourth indication information; the extended information block does not include the cellBarred information; or the extended information block includes the fourth indication information. The fourth indication information may include one or more bits. For example, the fourth indication information may include 1 bit, and the 1 bit is used as a reserved bit. Alternatively, the fourth indication information may include 1 bit, and one state represented by the 1 bit is used to indicate extension information messageClassExtension. Alternatively, the fourth indication information may include a plurality of bits, and is used to indicate a synchronization resource or a control resource set. The state 0 and the state 1 may also be used to distinguish between the two states. This is not limited to some embodiments. It should be noted that the third indication information is carried and sent by using a broadcast channel. In this case, the first information is the broadcast channel, and the third indication information may be 1-bit choice information.

In a possible implementation, the first indication information is indicated by using 1 bit; and the bit state of the first indication information is the bit state in the first state set, a bit state of the second indication information is a third state, and the network device supports the first terminal device in accessing the network device; or the bit state of the first indication information is the bit state in the first state set, a bit state of the second indication information is a fourth state, and the network device supports the first terminal device in accessing the network device; or the bit state of the first indication information is the bit state in the second state set, a bit state of the second indication information is a third state, and the network device does not support the first terminal device in accessing the network device; or the bit state of the first indication information is the bit state in the second state set, a bit state of the second indication information is a fourth state, and the network device does not support the first terminal device in accessing the network device, where the third state and the fourth state include 0 and 1, and the third state is different from the fourth state.

The second indication information is in the third state or the fourth state. The third state includes 0 or 1, and the fourth state includes 1 or 0. When the third state is 1, the fourth state is 0. When the third state is 0, the fourth state is 1. The bit state in the first state set and the second indication information may jointly indicate whether the network device supports access to the network device.

In this manner, an access status of the first terminal device may be more flexibly indicated. Compared with conventional technology, in which indication information used to indicate the first terminal device to access the network device is not provided, the solutions provided in this application are more applicable to a load balancing requirement existing when the first terminal device accesses the network device.

In a possible implementation, the first indication information is indicated by using 2 bits; and the network device supports the first terminal device in accessing the network device, the bit state of the first indication information includes the first state set, and the first state set includes {10, 11} or {01, 11}; or the network device does not support the first terminal device in accessing the network device, the bit state of the first indication information includes the first state set, and the first state set includes {00, 01} or {00, 10}, where the first state set indicates that the network device supports the first terminal device in accessing the network device, the second state set indicates that the network device does not support the first terminal device in accessing the network device, and the first state set is different from the second state set.

The first indication information is indicated by using 2 bits. When the first state set is {10, 11}, the second state set is {00, 01}. When the first state set is {01, 11}, the second state set is {00, 10}. The first state set indicates that the network device supports the first terminal device in accessing the network device, and the second state set indicates that the network device does not support the first terminal device in accessing the network device.

In this manner, an access status of the first terminal device may be more flexibly indicated. Compared with conventional technology, in which indication information used to indicate the first terminal device to access the network device is not provided, the solutions provided in this application are more applicable to a load balancing requirement existing when the first terminal device accesses the network device.

In a possible implementation, the bit state of the first indication information and/or the bit state of the second indication information are/is used to indicate an access mode to be used by the first terminal device to access the network device, and different access modes correspond to different formats of same associated information; and the associated information of the access mode includes one or more of the following: information about a synchronization resource, information about a control resource set (CORESET), information about an access resource, information about a system information block, information about a data channel resource, information about an aggregation level supported by the control resource set, information about a control channel resource, information about the number of symbols of a control channel, information about a search space configuration, information about the number of repetitions of a first channel, information about an uplink bandwidth part, and information about a downlink bandwidth part.

It should be noted that the bit state of the first indication information and/or the bit state of the second indication information may indicate the access mode to be used by the first terminal device to access the network device, and different access modes correspond to different formats of associated information. That different access modes correspond to different formats of associated information may be understood as that the foregoing content of the same associated information is different. For example, if the associated information is the information about the control resource set, a control resource set existing when a first access mode is used to access the network device is a configured time-frequency resource CORESET #0, and a control resource set existing when a second access mode is used to access the network device is a resource set offset from a time domain of the CORESET #0. The access mode may be a shared access mode or an independent access mode, or the access mode corresponds to the associated information.

In addition, as described above, the second indication information is not applied to the first terminal device, but may be applied to a second terminal device. The first terminal device and the second terminal device have different first features. A parameter of the first feature includes at least one of the following: a bandwidth (e.g., channel bandwidth), the number of supported or configured resource units (the resource unit may be a resource block (RB), a resource element (RE), a subcarrier, an RB group, a resource element group (REG) bundle, a control channel element, a subframe, a radio frame, a slot, a mini slot, or a symbol), the number of transmit antenna ports and/or the number of receive antenna ports, the number of radio frequency channels, the number of hybrid automatic repeat request (HARM) processes, a supported peak rate, an application scenario, a delay requirement, a processing capability, a protocol version, a duplex mode (a half duplex mode or a full duplex mode), and a service (an internet of things (IoT) application such as video surveillance or mobile broadband (MBB)). All resource units appearing in this application are content included in the resource unit.

In addition, the information about the synchronization resource includes one or more of a time domain resource position, a frequency domain resource position, a resource index, the number of resource units, a bandwidth, and a transmission period of an SSB. The first terminal device accesses the network device by using a synchronization signal/physical broadcast channel block (e.g., ss/pbch block, SSB) different from that used by the second terminal device, to facilitate load balancing. Alternatively, when a first feature of the first terminal device is different from a first feature of the second terminal device, for example, when a channel bandwidth supported by the first terminal device is less than that supported by the second terminal device, the first terminal device cannot access the network device by using an SSB the same as that used by the second terminal device, and in this case, a dedicated SSB is required.

The information about the control resource set includes one or more of a time domain resource position, a frequency domain resource position, a resource index, the number of resource units, and a bandwidth of the control resource set, for example, the number of resource units of the CORESET #0. In the CORESET #0, UE performs blind detection to detect a physical downlink control channel (PDCCH). The PDCCH is used to schedule a physical downlink shared channel (PDSCH) that carries a SIB 1.

The information about the access resource includes one or more of a time domain resource position, a frequency domain resource position, a resource index, the number of resource units, a bandwidth, a sequence transmission period, and a mapping relationship with an SSB of a random access resource, or includes one or more of a time domain resource position, a frequency domain resource position, a resource index, the number of resource units, and a bandwidth of an initial access resource.

The information about the system information block includes information indicating whether the system information block is shared.

The information about the data channel resource includes one or more of a time domain resource position, a frequency domain resource position, a resource index, the number of resource units, a bandwidth, and information indicating whether the data channel resource is shared, for example, information indicating that a data channel is a data channel that carries the SIB 1.

The information about the aggregation level supported by the control resource set is a control channel element (CCE) aggregation level supported by the control resource set. Receiving performance of the control channel can be improved if a relatively high aggregation level is supported. Different maximum aggregation levels supported by control resource sets may be configured for the first terminal device and the second terminal device.

The information about the control channel resource is associated with the channel bandwidth and/or a subcarrier spacing (SCS) supported by the first terminal device, and a larger number of resource units are selected as much as possible on the basis of the channel bandwidth. The number of resource units of a control channel of the first terminal device is greater than the number of resource units of a control channel of the second terminal device.

Information about the number of symbols of the control channel: the number of symbols of the control channel is associated with the aggregation level supported by the control resource set. An increase in the number of symbols of the control channel helps increase the aggregation level. The number of symbols of the control channel of the first terminal device is greater than the number of symbols of the control channel of the second terminal device.

Information about the search space configuration: a search space configuration of the control channel of the first terminal device may be different from a search space configuration of the second terminal device. For example, there are different periods of detecting a search space, different numbers of search spaces in each time unit, and different time positions of monitoring a downlink control channel in each time unit.

Information about the number of repetitions of the first channel: the number of repetitions of the first channel sent or received by the first terminal device may be explicitly or implicitly configured. Performance of the first channel may be improved if the first channel is repeated for a plurality of times, to facilitate decoding.

The information about the uplink bandwidth part (BWP) includes one or more of a time domain resource position, a frequency domain resource position, a resource index, the number of resource units, and a bandwidth of an initial uplink BWP, or includes one or more of a time domain resource position, a frequency domain resource position, a resource index, the number of resource units, and a bandwidth of an uplink active BWP.

The information about the downlink BWP includes one or more of a time domain resource position, a frequency domain resource position, a resource index, the number of resource units, and a bandwidth of an initial uplink BWP, or includes one or more of a time domain resource position, a frequency domain resource position, a resource index, the number of resource units, and a bandwidth of a downlink active BWP.

In this manner, the associated information may be indicated when it is indicated whether the first terminal device is supported in accessing the network device. Therefore, a resource to be used by the first terminal device to access the network device can be flexibly indicated.

In a possible implementation, the master information block, the downlink control information, or the system information block further includes a first parameter, and the first parameter includes one or more of the following parameters: the information about the synchronization resource of the first terminal device, the information about the aggregation level supported by the control resource set, the information about the number of symbols of the control channel, information about a resource unit of the control channel, the information about the search space configuration, and the information about the number of repetitions of the first channel.

In this application, the first parameter may be a bit in the first information, or may be an independent field in the first new message. Information indicated in the first parameter is information dedicated to the first terminal device, which helps improve performance of the first terminal device. For example, a relatively low channel code rate may be achieved, performance of decoding the downlink control channel by the first terminal device may be improved, interference may be reduced, a signal-to-noise ratio of the control channel may be increased, and coverage of the downlink control channel may be enhanced.

In a possible implementation, the aggregation level supported by the control resource set is greater than or equal to a first threshold, and the first threshold includes 8*n, where n is a positive integer greater than or equal to 1.

In this application, the aggregation level supported by the control resource set is increased in this manner, to help improve performance of the first terminal device. For example, a relatively low channel code rate may be achieved, performance of decoding the downlink control channel by the first terminal device may be improved, interference may be reduced, and a signal-to-noise ratio of the control channel may be increased.

In a possible implementation, the number of symbols in the information about the number of symbols of the control channel is greater than or equal to a second threshold, and the second threshold includes 3 or 4.

In this application, the aggregation level supported by the control resource set is increased in this manner, to help improve performance of the first terminal device. For example, a relatively low channel code rate may be achieved, performance of decoding the downlink control channel by the first terminal device may be improved, interference may be reduced, and a signal-to-noise ratio of the control channel may be increased.

In a possible implementation, the number of repetitions of the first channel is associated with at least one of the information about the aggregation level supported by the control resource set, the information about the resource unit of the control channel, the number of symbols of the control channel, and the information about the search space configuration.

In this application, the first parameter may be a bit in the first information, or may be an independent field in the first new message. Information indicated in the first parameter is information dedicated to the first terminal device, which helps improve performance of the first terminal device. For example, a relatively low channel code rate may be achieved, performance of decoding the downlink control channel by the first terminal device may be improved, interference may be reduced, a signal-to-noise ratio of the control channel may be increased, and coverage of the downlink control channel may be enhanced.

According to a second aspect, this application provides a resource information indication method, including: a first terminal device obtains first information, where the first information includes first indication information; and the first terminal device demodulates the first information to obtain the first indication information, where a bit state of the first indication information is a bit state in a first state set, and a network device supports the first terminal device in accessing the network device, and/or a bit state of the first information is a bit state in a second state set, and the network device does not support the first terminal device in accessing the network device.

The network device indicates, by using different bit states, whether the first terminal device is supported in accessing the network device. In stating that a network device supports the first terminal device in accessing the network device in this application means that the network device is capable of supporting the terminal device in accessing the network device, or the network device allows the terminal device to access the network device. The first indication information may include one or more bits. There may be one or more bit states in the first state set, and there may be one or more bit states in the second state set. The number of bits in the first state set is the same as the number of bits in the second state set. For example, if the bit state in the first state set includes 1 bit, the bit state in the second state set also includes 1 bit. Compared with conventional technology, in which indication information used to indicate the first terminal device to access the network device is not provided, the solutions provided in this application are more applicable to a load balancing requirement existing when the first terminal device accesses the network device.

In a possible implementation, the first information includes a master information block sent by the network device.

In this application, the first information includes the master information block, so that the network device may send the first indication information by using the master information block.

In a possible implementation, the master information block further includes second indication information, the second indication information is cellBarred information, and the cellBarred information is not applied to the first terminal device.

In this application, that the second indication information is not applied to the first terminal device may be understood as that when a state of the second indication information is that access to the network device is not supported, the state is invalid for the first terminal device. Therefore, whether the network device supports the first terminal device in accessing the network device can be independently controlled.

In a possible implementation, the first information includes downlink control information or a system information block sent by the network device.

In this application, the first information includes the downlink control information or the system information block. A downlink shared channel scheduled by using the downlink control information carries the system information block, and the network device may send the first indication information by using the downlink control information or the system information block. There are a relatively large number of reserved bits, namely, available bits, in the downlink control information or the system information block, and therefore sending of the first indication information is further facilitated.

In a possible implementation, the first terminal device obtains third indication information that is used to indicate a broadcast channel type and that is sent by the network device, where a state of the third indication information is 0, and the first information is a master information block included on a broadcast channel; or a state of the third indication information is 1, and the first information is an extended information block included on a broadcast channel; and the extended information block does not include cellBarred information, and/or the extended information block includes fourth indication information.

In this application, the extended information block may be an information block dedicated to the first terminal device. The information block includes one or more bits, or includes one or more pieces of information. For example, the extended information block does not include the cellBarred information, and the extended information block includes the fourth indication information; the extended information block does not include the cellBarred information; or the extended information block includes the fourth indication information. The fourth indication information may include one or more bits. For example, the fourth indication information may include 1 bit, and the 1 bit is used as a reserved bit. Alternatively, the fourth indication information may include 1 bit, and one state represented by the 1 bit is used to indicate extension information messageClassExtension. Alternatively, the fourth indication information may include a plurality of bits, and is used to indicate a synchronization resource or a control resource set. The state 0 and the state 1 may also be used to distinguish between the two states. This is not limited. It should be noted that the third indication information is carried and sent by using a broadcast channel. In this case, the first information is the broadcast channel, and the third indication information may be 1-bit choice information (e.g., choice).

In a possible implementation, the first indication information is indicated by using 1 bit; and the bit state of the first indication information is the bit state in the first state set, a bit state of the second indication information is a third state, and the first terminal device is to access the network device; or the bit state of the first indication information is the bit state in the first state set, a bit state of the second indication information is a fourth state, and the first terminal device is to access the network device; or the bit state of the first indication information is the bit state in the second state set, a bit state of the second indication information is a third state, and the first terminal device is not to access the network device; or the bit state of the first indication information is the bit state in the second state set, a bit state of the second indication information is a fourth state, and the first terminal device is not to access the network device, where the third state and the fourth state include 0 and 1, and the third state is different from the fourth state.

In this manner, an access status of the first terminal device may be more flexibly indicated. Compared with conventional technology, in which indication information used to indicate the first terminal device to access the network device is not provided, the solutions provided in this application are more applicable to a load balancing requirement existing when the first terminal device accesses the network device.

In a possible implementation, the first indication information is indicated by using 2 bits; and the first terminal device is to access the network device, the bit state of the first indication information includes the first state set, and the first state set includes {10, 11} or {01, 11}; or the first terminal device is not to access the network device, the bit state of the first indication information includes the first state set, and the first state set includes {00, 01} or {00, 10}, where the first state set indicates that the network device supports the first terminal device in accessing the network device, the second state set indicates that the network device does not support the first terminal device in accessing the network device, and the first state set is different from the second state set.

In this manner, an access status of the first terminal device may be more flexibly indicated. Compared with the conventional technology in which indication information used to indicate the first terminal device to access the network device is not provided, the solutions provided in this application are more applicable to a load balancing requirement existing when the first terminal device accesses the network device.

In a possible implementation, the bit state of the first indication information and/or the bit state of the second indication information are/is used to indicate an access mode to be used by the first terminal device to access the network device, and different access modes correspond to different formats of same associated information; and the associated information of the access mode includes one or more of the following: information about a synchronization resource, information about a control resource set, information about an access resource, information about a system information block, information about a data channel resource, information about an aggregation level supported by the control resource set, information about a control channel resource, information about the number of symbols of a control channel, information about a search space configuration, information about the number of repetitions of a first channel, information about an uplink bandwidth part, and information about a downlink bandwidth part.

In this manner, the associated information may be indicated when it is indicated whether the first terminal device is supported in accessing the network device. Therefore, a resource to be used by the first terminal device to access the network device can be flexibly indicated.

In a possible implementation, the master information block, the downlink control information, or the system information block further includes a first parameter, and the first parameter includes one or more of the following parameters: the information about the synchronization resource of the first terminal device, the information about the aggregation level supported by the control resource set, the information about the number of symbols of the control channel, information about a resource unit of the control channel, the information about the search space configuration, and the information about the number of repetitions of the first channel.

In this application, the first parameter may be a bit in the first information, or may be an independent field in the first new message. Information indicated in the first parameter is information dedicated to the first terminal device, which helps improve performance of the first terminal device. For example, a relatively low channel code rate may be achieved, performance of decoding the downlink control channel by the first terminal device may be improved, interference may be reduced, a signal-to-noise ratio of the control channel may be increased, and coverage of the downlink control channel may be enhanced.

In a possible implementation, the aggregation level supported by the control resource set is greater than or equal to a first threshold, and the first threshold includes 8*n, where n is a positive integer greater than or equal to 1.

In this application, the aggregation level supported by the control resource set is increased in this manner, to help improve performance of the first terminal device. For example, a relatively low channel code rate may be achieved, performance of decoding the downlink control channel by the first terminal device may be improved, interference may be reduced, and a signal-to-noise ratio of the control channel may be increased.

In a possible implementation, the number of symbols in the information about the number of symbols of the control channel is greater than or equal to a second threshold, and the second threshold includes 3 or 4.

In this application, the aggregation level supported by the control resource set is increased in this manner, to help improve performance of the first terminal device. For example, a relatively low channel code rate may be achieved, performance of decoding the downlink control channel by the first terminal device may be improved, interference may be reduced, and a signal-to-noise ratio of the control channel may be increased.

In a possible implementation, the number of repetitions of the first channel is associated with at least one of the information about the aggregation level supported by the control resource set, the information about the resource unit of the control channel, the number of symbols of the control channel, and the information about the search space configuration.

In this application, the first parameter may be a bit in the first information, or may be an independent field in the first new message. Information indicated in the first parameter is information dedicated to the first terminal device, which helps improve performance of the first terminal device. For example, a relatively low channel code rate may be achieved, performance of decoding the downlink control channel by the first terminal device may be improved, interference may be reduced, a signal-to-noise ratio of the control channel may be increased, and coverage of the downlink control channel may be enhanced.

According to a third aspect, this application provides a communications apparatus, including: a processing unit (e.g., processing circuit), configured to determine first indication information, where a bit state of the first indication information is a bit state in a first state set, and a network device supports a first terminal device in accessing the network device, and/or a bit state of the first information is a bit state in a second state set, and the network device does not support the first terminal device in accessing the network device; and a transceiver unit (e.g., transceiver circuit), configured to send first information, where the first information includes the first indication information.

According to a fourth aspect, this application provides a communications apparatus, including: A transceiver unit, configured to obtain first information, where the first information includes first indication information; and a processing unit (e.g., processing circuit), configured to demodulate the first information to obtain the first indication information, where a bit state of the first indication information is a bit state in a first state set, and a network device supports a first terminal device in accessing the network device, and/or a bit state of the first information is a bit state in a second state set, and the network device does not support the first terminal device in accessing the network device.

According to a fifth aspect, this application provides a communications apparatus, including a processor and a memory. The memory stores a computer program. The processor is configured to execute the computer program stored in the memory, so that the method according to the first aspect or the method according to the second aspect is performed.

According to a sixth aspect, this application provides a communications apparatus, including a logic circuit and an interface circuit.

The interface circuit is configured to determine first indication information. A bit state of the first indication information is a bit state in a first state set, and a network device supports a first terminal device in accessing the network device, and/or a bit state of the first information is a bit state in a second state set, and the network device does not support the first terminal device in accessing the network device.

The logic circuit is configured to perform the method according to the first aspect.

According to a seventh aspect, this application provides a communications apparatus, including a logic circuit and an interface circuit.

The interface circuit is configured to obtain first information. A bit state of first indication information is a bit state in a first state set, and a network device supports a first terminal device in accessing the network device, and/or a bit state of the first information is a bit state in a second state set, and the network device does not support the first terminal device in accessing the network device.

The logic circuit is configured to perform the method according to the second aspect.

According to an eighth aspect, an embodiment of this application further provides a computer-readable storage medium. The computer-readable storage medium stores computer-readable instructions. When the computer-readable instructions are run on a computer, the computer is enabled to perform the method in any possible design of the first aspect or the second aspect.

According to a ninth aspect, an embodiment of this application provides a chip system. The chip system includes a processor, and may further include a memory, configured to implement the method in any possible design of the first aspect or the second aspect. The chip system may include a chip, or include a chip and another discrete component.

According to a tenth aspect, an embodiment of this application provides a communications system. The system includes a terminal device and a network device. The terminal device is configured to perform the method in any possible design of the first aspect or the second aspect.

According to an eleventh aspect, a computer program product that includes instructions is provided. When the computer program product is run on a computer, the computer is enabled to perform the method in any possible design of the first aspect and the second aspect.

For technical effects that can be achieved in the third aspect to the eleventh aspect, refer to the description of the technical effects that can be achieved in the corresponding possible design solutions in the first aspect. Details are not described herein in this application.

DESCRIPTION OF EMBODIMENTS

Figure 1:
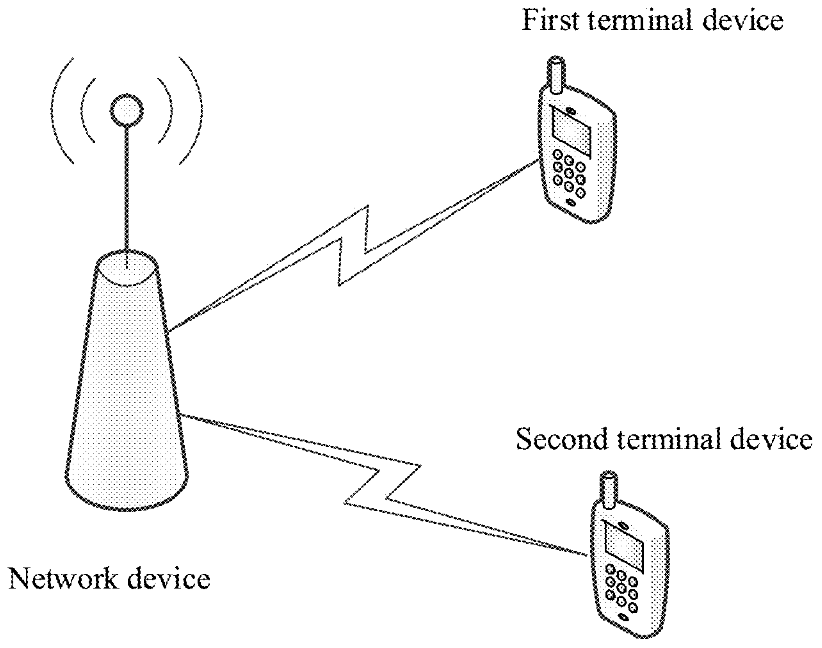
FIG. 1 is a schematic diagram of a communications system according to an embodiment of this application.

To make objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

To better describe the solutions of this application, nouns used in this application are first explained and described below.

A network device is a node in a radio access network (RAN), and may also be referred to as a base station, or may be referred to as a RAN node (or device). Currently, some examples of access network devices are a transmission/reception point (TRP), an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), a wireless fidelity (Wifi) access point (AP), a network device in a 5G communications system, a network device in a future possible communications system, or a satellite. The network device may alternatively be another device having a network device function. For example, the network device may alternatively be a device that has a network device function in device-to-device (D2D) or machine-to-machine (M2M) communication, for example, an internet of vehicles device. The network device may alternatively be a network device in a future possible communications system.

A terminal device may also be referred to as user equipment (UE), a mobile station (MS), a mobile terminal (MT), or the like, and is a device that provides voice or data connectivity for a user, or may be an Internet of things (IoT) device. For example, the terminal device includes a handheld device or a vehicle-mounted device having a wireless connection function. Currently, the terminal device may be a mobile phone, a tablet computer, a notebook computer, a palmtop computer, a mobile internet device (MID), a wearable device (for example, a smart watch, a smart band, or a pedometer), a vehicle-mounted device (for example, a vehicle, a bicycle, an electric vehicle, an airplane, a ship, a train, or a high-speed rail), a virtual reality (VR) device, an augmented reality (AR) device, a wireless terminal in industrial control, a smart household device (for example, a refrigerator, a television, an air conditioner, or a meter), a smart robot, a workshop device, a wireless terminal in self-driving, a wireless terminal in a remote medical surgery, a wireless terminal in a smart grid, a wireless terminal in transportation safety (transportation safety), a wireless terminal in a smart city, a wireless terminal in a smart home, a flight device (for example, a smart robot, a hot air balloon, an unmanned aerial vehicle, or an airplane), or the like. System information (SI) includes a master information block (MIB) and a plurality of system information blocks (SIGs). To access a new radio (NR) network, user equipment (UE) need to perform processes such as cell search, obtaining of system information, and random access. A main purpose of cell search is to obtain downlink synchronization, a physical cell identification (PCI) of a cell, and new system information of the cell. In a cell search process, a synchronization signal block (SSB) needs to be searched for. Content included in the SSB is a primary synchronization signal (PSS), a secondary synchronization signal (SSS), a demodulation reference signal (DMRS), and a PBCH. The UE may obtain downlink synchronization, a PCI of a cell, and system information (SI) of the cell by using the SSB. The UE needs to obtain the SI of the cell to know how the cell is configured, so as to access the cell and work correctly in the cell. The SI is cell-level information, and is valid for all UEs that access the cell.

It should be noted that in this application, a parameter that may be used to represent a first feature of a terminal device includes one or more of the following:

Bandwidth (e.g., channel bandwidth): The bandwidth is a supported or configured bandwidth of the terminal device. In this application, a bandwidth of a first terminal device may be different from a bandwidth of a second terminal device. For example, the bandwidth of the first terminal device is 20 M, and the bandwidth of the second terminal device is 100 M.

Number of supported or configured resource units: For example, the number of resources supported by the first terminal device is 48 resource blocks (RBs), and the number of resources supported by the second terminal device is 96 RBs.

Number of transmit antenna ports and/or number of receive antenna ports: The number of transmit antenna ports and/or the number of receive antenna ports of the first terminal device are/is different from those/that of the second terminal device. For example, the number of transmit antenna ports and the number of receive antenna ports of the first terminal device are respectively 1 and 2, and the number of transmit antenna ports and the number of receive antenna ports of the second terminal device are respectively 2 and 4.

Number of radio frequency channels: The number of radio frequency channels of the first terminal device is different from that of the second terminal device. For example, the number of radio frequency channels of the first terminal device is 1, and the number of radio frequency channels of the second terminal device is 2.

Number of hybrid automatic repeat request (HARQ) processes: The number of HARQ processes supported by the first terminal device is different from that supported by the second terminal device. For example, the number of HARQ processes of the first terminal device is 8, and the number of HARQ processes of the second terminal device is 16.

Supported peak rate: A maximum peak rate of the first terminal device is different from that of the second terminal device. For example, the maximum peak rate supported by the first terminal device is 100 Mbps, and the peak rate supported by the second terminal device is 200 Mbps.

Application scenario: The first terminal device and the second terminal device serve different application scenarios. For example, the first terminal device is applied to an industrial wireless sensor, video surveillance, and a wearable device, and the second terminal device is applied to mobile communication and video internet access.

Delay requirement: The first terminal device and the second terminal device have different requirements on a transmission delay. For example, a delay requirement of the first terminal device is 500 milliseconds, and a delay requirement of the second terminal device is 100 milliseconds.

Processing capability: There are different time sequences and speeds of processing, by the first terminal device and the second terminal device, channels or data under different subcarrier spacing (SCS) conditions. For example, the first terminal device does not support a complex operation (the complex operation includes artificial intelligence (AI) or VR rendering), and the second terminal device supports the complex operation. For example, a processing capability of the first terminal device is lower than that of the second terminal device.

Protocol version: The first terminal device and the second terminal device are terminal devices that support different protocol versions. For example, a protocol version supported by the first terminal device is Release 17, and a protocol version supported by the second terminal device is Release 15.

Duplex mode (a half duplex mode or a full duplex mode): For example, the first terminal device works in the half duplex mode, and the second terminal device works in the full duplex mode.

Service (an IoT application such as video surveillance or mobile broadband (MBB)): For example, a service supported by the first terminal device is video surveillance, and a service supported by the second terminal device is MBB.

In addition, for parameters of a same first feature, parameter values of the first feature of different terminal devices are different, and device performance of the first terminal device is poorer than device performance represented by a parameter value of the first feature of the second terminal device. For example, the peak rate supported by the first terminal device is 100 Mbps, and the peak rate supported by the second terminal device is 200 Mbps, and it may be learned that the performance of the first terminal device is poorer than the device performance of the second terminal device. In this application, the first terminal device may be RedCap UE, and the second terminal device may be legacy UE. Alternatively, the first terminal device is a terminal device whose parameter value of the first feature is less than a parameter value of the second terminal device. This is not limited herein. Any terminal device whose parameter value of the first feature is less than the parameter value of the first feature of the second terminal device meets a requirement of the first terminal device in this application.

In a related technology, a MIB is carried on a physical broadcast channel (PBCH) for transmission, and legacy UE may obtain a structure of the MIB by decoding an SSB. The structure of the MIB is as follows:

```
MIB ::=                    SEQUENCE {
    systemFrameNumber          BIT STRING (SIZE (6)),
    subCarrierSpacingCommon        ENUMERATED {scs15or60,
scs30or120},
    ssb-SubcarrierOffset   INTEGER (0..15),
    dmrs-TypeA-Position        ENUMERATED {pos2, pos3},
    pdcch-ConfigSIB1               PDCCH-ConfigSIB1,
    cellBarred                 ENUMERATED {barred, notBarred},
    intraFreqReselection   ENUMERATED {allowed, notAllowed},
    spare                          BIT STRING (SIZE (1))
}
```

The systemFrameNumber field, the subCarrierSpacingCommon field, the ssb-SubcarrierOffset field, the dmrs-TypeA-Position field, the pdcch-ConfigSIB1 field, the cellBarred field, the intraFreqReselection field, and the spare field included in the MIB are shown in the structure of the MIB. The systemFrameNumber field is used to indicate a system frame number, and SIZE (6) represents a bit string that includes 6 bits. The subCarrierSpacingCommon field is used to indicate an SCS, scs15or60 represents that the SCS is 15 KHz or 30 KHz, and scs30or120 represents that the SCS is 30 KHz or 120 KHz. The ssb-SubcarrierOffset field is used to indicate a frequency domain offset of a frequency domain position of the SSB relative to a reference point, and INTEGER (0..15) represents 16 optional values. The dmrs-TypeA-Position field is used to indicate positions of a downlink DMRS and an uplink DMRS, and pos2 and pos3 represent enumerated positions. The pdcch-ConfigSIB1 field is used to indicate information about a control resource set and information about a search space, and PDCCH-ConfigSIB1 represents configuration information of a control resource set (CORESET #0) whose index is 0 and configuration information of a search space (search space #0, SS #0) whose index is 0. For ½ of a frequency domain range or different SCSs, there are 16 configurations for each of the CORESET #0 and the SS #0, and information about the CORESET #0 and information about the SS #0 are determined by indicating one configuration. The cellBarred field is used to indicate whether a network device allows the legacy UE to access the network device, barred represents not allowed, and notBarred represents allowed. The intraFreqReselection field is used to indicate whether the legacy UE can access a cell of this frequency, allowed represents that the legacy UE is allowed to access the cell of this frequency, and notAllowed represents that the legacy UE is not allowed to access the cell of this frequency. The spare field is used to indicate that the field is a reserved field, and SIZE (1) represents that the spare field includes 1 bit. If the cellBarred field indicates barred, and the intraFreqReselection field indicates notAllowed, access of the legacy UE is not allowed for the entire frequency.

In addition, it should be further noted that a SIB is carried on a physical downlink shared channel (PDSCH) for transmission, and the PDSCH is scheduled by using a physical downlink control channel (PDCCH). The PDCCH includes one or more control channel elements (CCEs), which may be measured by using an aggregation level. In other words, the aggregation level is determined based on the number of consecutive CCEs occupied by the PDCCH. In a related technology, the CCE aggregation level usually may be 1, 2, 4, 8, or 16.

A CORESET represents a time-frequency resource set used to carry the PDCCH. One CORESET includes $$N_{RB}^{CORESET}$$

RBs in frequency domain, and duration in time domain is $$N_{symbol}^{CORESET} \in \{1, 2, 3\}$$

symbols. A plurality of CORESETs may be configured for one UE.

It should be noted that the pdcch-ConfigSIB1 field in the MIB indicates an element in a predefined resource set CORESET table. The information about the CORESET #0 may be obtained by using the CORESET table. The network device sends the PDCCH on a candidate resource of the CORESET. The legacy UE detects all candidate resources based on a specific rule in a blind detection manner (the rule includes that a type of an aggregation level is detected, there are different numbers of candidate resources for different aggregation levels, and downlink control information (DCI) in different scrambling modes is detected), until the PDCCH is successfully decoded. In addition, the CORESET #0 supports only aggregation levels 4, 8, and 16. For the CORESET #0, the aggregation level is determined by dividing the number of RBs of the CORESET*the number of symbols of the CORESET by 6.

A network access status of the legacy UE may be indicated by using information in the MIB or the SIB in the conventional technology. However, no solution for accessing the network device is provided for a RedCap UE. Therefore, the RedCap UE cannot access the network device and receive a communication service by using an existing technical solution. In addition, when an excessively large number of terminals simultaneously access the network device, the network device needs to more flexibly control access of the RedCap UE or the legacy UE.

To enable the RedCap UE to access the network device and receive a communication service, and enable the network device to more flexibly control access of the RedCap UE or the legacy UE, this application provides a resource information indication method, so that the RedCap UE can access the network device and receive a communication service. FIG. 1 is a schematic diagram of a system to which a resource information indication method can be applied according to an embodiment of this application. The system includes a network device, a first terminal device, and a second terminal device. The first terminal device may be RedCap UE, and the second terminal device may be legacy UE. Only one first terminal device and one second terminal device are shown in FIG. 1. However, in actual application, the number of first terminal devices and the number of second terminal devices are not limited. In this application, the network device may separately send a MIB or a SIB to the first terminal device and/or the second terminal device, to indicate whether the first terminal device and/or the second terminal device are/is supported in accessing the network device.

It should be noted that, that the network device supports the first terminal device in accessing the network device in this application means that the network device is capable of supporting the terminal device in accessing the network device, or the network device allows the terminal device to access the network device. That the network device is capable of supporting the terminal device in accessing the network device means that the fact that some network devices support a terminal device that has a specific first feature and do not support a terminal device that has a parameter of another first feature is considered. That the network device allows the terminal device to access the network device means that in consideration of a load balancing status of the network device, the network device does not allow access of some terminal devices when a relatively large number of terminal devices simultaneously access the network device in a specific time.

To enable the first terminal device to access the network device and receive a communication service, the network device indicates, by using an available bit in the MIB or a PBCH, whether the first terminal device is supported in accessing the network device and resource usage information. It should be noted that there are 64 bits in the MIB, and 1 bit may be used to indicate whether the first terminal device is supported in accessing the network device. It should be noted that when the number of SSBs of the PBCH in a half frame of a radio frame is less than 64, in other words, Lmax<64, only one of three most significant bits of the PBCH is used, and either of the other two bits may be used to indicate whether the first terminal device is supported in accessing the network device.

Figure 2:
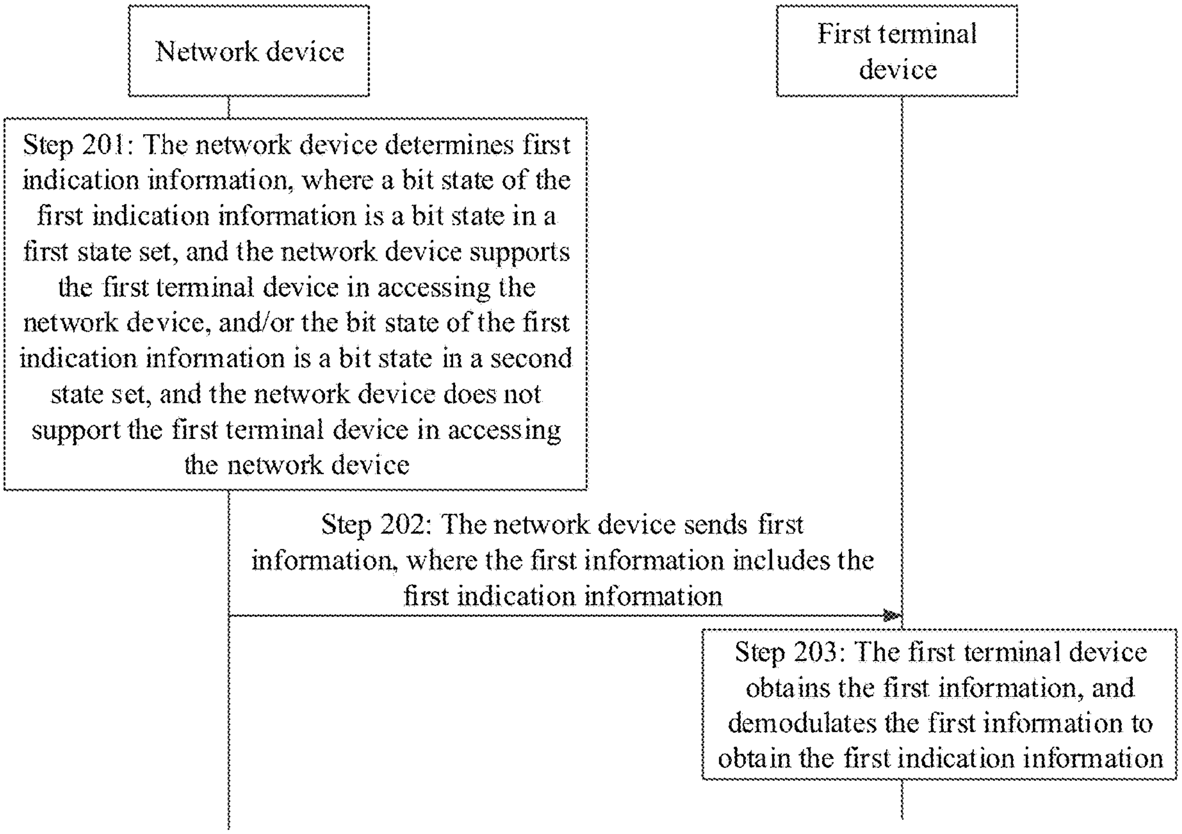
FIG. 2 is a flowchart of a resource information indication method according to an embodiment of this application.

FIG. 2 is a schematic flowchart of a resource information indication method according to an embodiment of this application. Specific execution is as follows:

Step 201: A network device determines first indication information, where a bit state of the first indication information is a bit state in a first state set, and the network device supports a first terminal device in accessing the network device, and/or the bit state of the first indication information is a bit state in a second state set, and the network device does not support the first terminal device in accessing the network device.

Step 202: The network device sends first information, where the first information includes the first indication information.

Step 203: The first terminal device obtains the first information, and demodulates the first information to obtain the first indication information.

For example, the first information may be carried by using physical layer signaling, higher layer signaling, or a broadcast channel. The physical layer signaling may be downlink control information, and the higher layer signaling may be radio resource control (RRC) or medium access control control element (MAC CE) signaling. This is not limited herein. In this application, the first information may include a MIB, a SIB 1, a downlink control channel (a SIB 1 is carried on a PDSCH for transmission, and the PDSCH is scheduled by using a PDCCH), or a broadcast channel (which may be a logical channel or a physical channel).

For example, if the first information is a MIB, the MIB includes the first indication information, and the MIB may further include second indication information. The second indication information may be a cellBarred field, and the cellBarred field is not applied to the first terminal device, or the field is invalid for the first terminal device.

In this application, when the first information is a MIB, the cellBarred field is not applied to the first terminal device, and the network device indicates, by using a dedicated field, whether the first terminal device is supported in accessing the network, to help indicate a dedicated network of the first terminal device. For example, in an industrial wireless sensor (IWS) in an industrial scenario, a position and the number of terminal devices are relatively stable, and communication of the terminal device can be better ensured if a dedicated network is used. When a dedicated field is used to indicate whether the first terminal device is supported in accessing the network, load balancing of the network device is further facilitated, and it may be controlled that only the first terminal device is allowed to access the network device in some scenarios, or only a second terminal device or another terminal device is allowed to access the network device in some scenarios.

For example, the first information is a SIB 1 or a PDCCH. Before the network device sends the first information, the network device sends a MIB, and the MIB includes a cellBarred field. The field is not applied to the first terminal device, or the field is invalid for the first terminal device.

For example, when the first information is a broadcast channel, the network device may send third indication information used to indicate a broadcast channel type, and the third indication information is 1-bit broadcast channel type indication information. For example, the third indication information may be 1-bit choice information (e.g., choice). When a choice state of the third indication information is 0, the first information is a MIB included on a broadcast channel. When a choice state of the third indication information is 1, the first information is an extended information block, and the extended information block may be an information block other than a MIB on a broadcast channel. The extended information block does not include second indication information indicating whether a second terminal device is supported in accessing the network device, for example, does not include a cellBarred field, and/or the extended information block includes fourth indication information on the broadcast channel, the fourth indication information indicates another extended information block, and the another extended information block may be used to indicate a terminal device that is compatible with a subsequent version.

In this application, the extended information block may be an information block dedicated to the first terminal device. The information block includes one or more bits, or includes one or more pieces of information. For example, the extended information block does not include the cell-Barred information, and the extended information block includes the fourth indication information; the extended information block does not include the cellBarred information; or the extended information block includes the fourth indication information. The fourth indication information may include one or more bits. For example, the fourth indication information may include 1 bit, and the 1 bit is used as a reserved bit. Alternatively, the fourth indication information may include 1 bit, and one state represented by the 1 bit is used to indicate extension information message-ClassExtension. Alternatively, the fourth indication information may include a plurality of bits, and is used to indicate a synchronization resource or a control resource set. The state 0 and the state 1 may also be used to distinguish between the two states. This is not limited to some embodiments. It should be noted that the third indication information is carried and sent by using a broadcast channel. In this case, the first information is the broadcast channel, and the third indication information may be 1-bit choice information. A structure of a MIB is described above. Details are not described herein. A structure of the extended information block may be that the extended information block does not include the cellBarred information, and the extended information block includes the fourth indication information; the extended information block does not include the cellBarred information; or the extended information block includes the fourth indication information. The structure of the extended information block may further include one or more of the following information: synchronization information of the first terminal device, information about a control resource set, SCS information, information about a reference channel, an indication of system frame number information, and a first parameter. Other fields are not limited. The extended information block may further include the first parameter. A method is the same as the method described in this application. Fields in the extended information block are shown in Table 1. Table 1 is merely an example for description, and constitutes no specific limitation. In the extended information block, a first field may indicate the fourth indication information, a second field may indicate information about a synchronization resource, a third field may indicate the information about the control resource set, a fourth field may indicate the SCS information, a fifth field may indicate the information about the reference channel, a sixth field may indicate the system frame number information, and a seventh field may indicate the first parameter. The extended information block further includes other fields. The fields are not shown one by one herein.

TABLE 1

| Fields in the extended information block | |
|---|---|
| First field | Fourth indication information |
| Second field | Synchronization information |
| Third field | Information about the control resource set |
| Fourth field | SCS information |
| Fifth field | Information about the reference channel |
| Sixth field | System frame number information |
| Seventh field | First parameter |
| . . . | . . . |

In this application, the extended information block may be an information block dedicated to the first terminal device. The information block includes one or more bits, or includes one or more pieces of information. For example, the extended information block does not include the cell-Barred information, and the extended information block includes the fourth indication information; the extended information block does not include the cellBarred information; or the extended information block includes the fourth indication information. The fourth indication information may include one or more bits. For example, the fourth indication information may include 1 bit, and the 1 bit is used as a reserved bit. Alternatively, the fourth indication information may include 1 bit, and one state represented by the 1 bit is used to indicate extension information message-ClassExtension. Alternatively, the fourth indication information may include a plurality of bits, and is used to indicate a synchronization resource or a control resource set. The state 0 and the state 1 may also be used to distinguish between the two states. This is not limited. It should be noted that the third indication information is carried and sent by using a broadcast channel. In this case, the first information is the broadcast channel, and the third indication information may be 1-bit choice information, to facilitate compatibility with a terminal that supports a subsequent version.

In addition, it should be noted that the first terminal device may receive the first information sent by the network device, or may obtain the first information through cell search, and determine, based on the first indication information, whether to access the network device. The first indication information may be indicated by using a bit in the MIB, or may be indicated by using a bit on the PBCH.

In addition, the bit state of the first indication information includes the bit state in the first state set or the bit state in the second state set. The bit state in the first state set is used to indicate that the network device supports the first terminal device in accessing the network device. The bit state in the second state set is used to indicate that the network device does not support the first terminal device in accessing the network device.

In this application, the first indication information may be indicated by using 1 bit, may be indicated by using 2 bits, or may be indicated by using at least 2 bits. This is not limited herein. Solutions in which the first indication information is indicated by using 1 bit and 2 bits are described below. The following cases are included:

Case 1: The First Indication Information is Indicated by Using 1 Bit.

When the first indication information is indicated by using 1 bit, each of the first state set and the second state set includes only one bit state. The bit state in the first state set is a first state, and the first state may be 1. The bit state in the second state set is a second state, and the second state may be 0. Alternatively, the first state is 0, and the second state is 1.

Case 2: The First Indication Information is Indicated by Using 2 Bits.

When the first indication information is indicated by using 2 bits, each of the first state set and the second state set includes one or more bit states, and the first state set and the second state set do not include a same bit state. For example, when the bit states in the first state set are {10, 11}, the bit states in the second state set are {00, 01}; or when the bit states in the first state set are {01, 11}, the bit states in the second state set are {00, 10}. Herein, 0 and 1 represent states, and content represented by the states may be interchanged.

When the first indication information is indicated by using 1 bit, it may be more concisely and intuitively indicated whether the first terminal device is supported in accessing the network device. When the first indication information is indicated by using 2 bits, more information, for example, resource information, and/or whether the second terminal device is supported in accessing the network device, may be indicated when it is indicated whether the first terminal device is supported in accessing the network device.

In addition, the first information further includes the second indication information. The second indication information is not applied to the first terminal device, but may be used to indicate whether the network device supports the second terminal device in accessing the network device. For example, the second indication information may be information indicated by the cellBarred field in the MIB. A bit state of the cellBarred field may be a third state or a fourth state. In a possibility, the third state and the fourth state are used to indicate whether the network device supports the first terminal device in accessing the network device. In a possibility, the third state is used to indicate that the network device supports the second terminal device in accessing the network device, and the fourth state is used to indicate that the network device does not support the second terminal device in accessing the network device. The third state is 0, and the fourth state is 1. Alternatively, the third state is 1, and the fourth state is 0.

For example, the first indication information and the second indication information may jointly indicate whether the first terminal device is supported in accessing the network device, or the first indication information and the second indication information may jointly indicate whether the first terminal device and the second terminal device are supported in accessing the network device. For example, the first indication information includes 1 bit, the cellBarred field includes 1 bit, and the following cases may be included:

Case 1: The bit state of the first indication information is the bit state in the first state set, a bit state of the second indication information is the third state, and in this case, the network device supports the first terminal device in accessing the network device. Alternatively, the first indication information includes 1 bit, the cellBarred field includes 1 bit, the bit state of the first indication information is the bit state in the first state set, a bit state of the second indication information is the third state, and in this case, the network device supports the first terminal device in accessing the network device, and the network device supports the second terminal device in accessing the network device.

Case 2: The bit state of the first indication information is the bit state in the first state set, a bit state of the second indication information is the fourth state, and the network device supports the first terminal device in accessing the network device. Alternatively, the bit state of the first indication information is the bit state in the first state set, a bit state of the second indication information is the third state, and in this case, the network device supports the first terminal device in accessing the network device, and the network device does not support the second terminal device in accessing the network device.

Case 3: The bit state of the first indication information is the bit state in the second state set, a bit state of the second indication information is the third state, and the network device does not support the first terminal device in accessing the network device. Alternatively, the bit state of the first indication information is the bit state in the second state set, a bit state of the second indication information is the third state, and in this case, the network device does not support the first terminal device in accessing the network device, and the network device supports the second terminal device in accessing the network device.

Case 4: The bit state of the first indication information is the bit state in the second state set, a bit state of the second indication information is the fourth state, and the network device does not support the first terminal device in accessing the network device. Alternatively, the bit state of the first indication information is the bit state in the second state set, a bit state of the second indication information is the fourth state, and in this case, the network device does not support the first terminal device in accessing the network device, and the network device does not support the second terminal device in accessing the network device.

For example, the first indication information may alternatively independently indicate whether the first terminal device is supported in accessing the network device; or the first indication information may independently indicate whether the first terminal device and the second terminal device are supported in accessing the network device.

The bit states in the first state set are {10, 11} or {01, 11}, and the network device supports the first terminal device in accessing the network device; or the bit states in the first state set are {10, 11} or {01, 11}, and the network device supports the first terminal device in accessing the network device; and/or the bit states in the second state set are {00, 01} or {00, 10}, and the network device does not support the first terminal device in accessing the network device; and/or the first state set and the second state set do not include a same state. On the basis of the foregoing content, further, content of the bit states may be interchanged. This is not limited herein. For example, the first indication information includes 2 bits, and the following cases may be included:

Case 1: The bit state of the first indication information is 00, and the network device does not support the first terminal device in accessing the network device. Alternatively, the bit state of the first indication information is 00, and the network device does not support the first terminal device in accessing the network device, and the network device does not support the second terminal device in accessing the network device.

Case 2: The bit state of the first indication information is 01, and the network device does not support the first terminal device in accessing the network device. Alternatively, the bit state of the first indication information is 01, and the network device does not support the first terminal device in accessing the network device, and the network device supports the second terminal device in accessing the network device.

Case 3: The bit state of the first indication information is 10, and the network device supports the first terminal device in accessing the network device. Alternatively, the bit state of the first indication information is 10, and the network device supports the first terminal device in accessing the network device, and the network device does not support the second terminal device in accessing the network device.

Case 4: The bit state of the first indication information is 11, and the network device supports the first terminal device in accessing the network device. Alternatively, the bit state of the first indication information is 11, and the network device supports the first terminal device in accessing the network device, and the network device supports the second terminal device in accessing the network device.

In the following description, the network device may indicate, by using both or one of the first indication information and the second indication information, a mode to be used by the first terminal device to access the network device. There may be the following three cases. It should be noted that the first terminal device may obtain corresponding associated information by reading the access mode.

For example, the associated information of the access mode includes one or more of the following: information about a synchronization resource, information about a control resource set, information about an access resource, information about a system resource block, information about a data channel resource, information about an aggregation level supported by the control resource set, information about a control channel resource, information about the number of symbols of a control channel, information about a search space configuration, information about the number of repetitions of a first channel, information about an uplink bandwidth part, and information about a downlink bandwidth part. The first channel may be a PDCCH, a physical uplink control channel (PUCCH), a PDSCH, or a physical uplink shared channel (PUSCH). This is not specifically limited herein. A resource usage status of the first terminal device may be obtained by using the foregoing resource control information.

The information about the synchronization resource includes a time domain resource position, a frequency domain resource position, and a resource index of an SSB. The first terminal device accesses the network device by using an SSB different from that used by the second terminal device, to facilitate load balancing. Alternatively, when a first feature of the first terminal device is different from a first feature of the second terminal device, for example, when a channel bandwidth supported by the first terminal device is less than that supported by the second terminal device, the first terminal device cannot access the network device by using an SSB the same as that used by the second terminal device, and in this case, a dedicated SSB is required.

The information about the control resource set includes one or more of a time domain resource position, a frequency domain resource position, a resource index, the number of resource units, and a bandwidth of the CORESET, for example, the number of resource units of a CORESET #0. In the CORESET #0, UE performs blind detection to detect a PDCCH. The PDCCH is used to schedule a PDSCH that carries a SIB 1.

The information about the access resource includes one or more of a time domain resource position, a frequency domain resource position, a resource index, the number of resource units, a bandwidth, a sequence transmission period, and a mapping relationship with an SSB of a random access resource, or includes one or more of a time domain resource position, a frequency domain resource position, a resource index, the number of resource units, and a bandwidth of an initial access resource.

The information about the system information block includes information indicating whether the system information block is shared.

The information about the data channel resource includes one or more of a time domain resource position, a frequency domain resource position, a resource index, the number of resource units, a bandwidth, and information indicating whether the data channel resource is shared, for example, information indicating that a data channel is a data channel that carries the SIB 1.

The information about the aggregation level supported by the control resource set is a CCE aggregation level supported by the control resource set. Receiving performance of the control channel can be improved if a relatively high aggregation level is supported. Different maximum aggregation levels supported by control resource sets may be configured for the first terminal device and the second terminal device.

The information about the control channel resource is associated with the channel bandwidth and/or an SCS supported by the first terminal device, and a larger number of resource units are selected as much as possible on the basis of the channel bandwidth. The number of resource units of a control channel of the first terminal device is greater than the number of resource units of a control channel of the second terminal device.

Information about the number of symbols of the control channel: The number of symbols of the control channel is associated with the aggregation level supported by the control resource set. An increase in the number of symbols of the control channel helps increase the aggregation level. The number of symbols of the control channel of the first terminal device is greater than the number of symbols of the control channel of the second terminal device.

Information about the search space configuration: A search space configuration of the control channel of the first terminal device may be different from a search space configuration of the second terminal device. For example, there are different periods of detecting a search space, different numbers of search spaces in each time unit, and different time positions of monitoring a downlink control channel in each time unit.

Information about the number of repetitions of the first channel: The number of repetitions of the first channel sent or received by the first terminal device may be explicitly or implicitly configured. Performance of the first channel may be improved if the first channel is repeated for a plurality of times, to facilitate decoding.

The information about the uplink BWP includes one or more of a time domain resource position, a frequency domain resource position, a resource index, the number of resource units, and a bandwidth of an initial uplink BWP, or includes one or more of a time domain resource position, a frequency domain resource position, a resource index, the number of resource units, and a bandwidth of an uplink active BWP.

The information about the downlink BWP includes one or more of a time domain resource position, a frequency domain resource position, a resource index, the number of resource units, and a bandwidth of an initial uplink BWP, or includes one or more of a time domain resource position, a frequency domain resource position, a resource index, the number of resource units, and a bandwidth of a downlink active BWP.

It should be noted that the bit state of the first indication information and/or the bit state of the second indication information are/is used to indicate the access mode to be used by the first terminal device to access the network device, and different access modes correspond to different formats of same associated information. That different access modes correspond to different formats of associated information may be understood as that the foregoing content of the same associated information is different. For example, if the associated information is the information about the control resource set, a control resource set existing when a first access mode is used to access the network device is a configured time-frequency resource CORESET #0, and a control resource set existing when a second access mode is used to access the network device is a resource set offset from a time domain of the CORESET #0. The access mode may be a shared access mode or an independent access mode, or the access mode corresponds to the associated information. In this manner, the associated information may be indicated when it is indicated whether the first terminal device is supported in accessing the network device. Therefore, a resource to be used by the first terminal device to access the network device can be flexibly indicated.

For example, the mode to be used by the first terminal device to access the network device includes a first access mode and a second access mode. A format of the associated information of the first access mode is different from a format of the associated information of the second access mode. For example, the format of the associated information may be one or more of time domain position information, frequency domain position information, code domain position information, a resource index, a time domain resource offset, a frequency domain resource offset, a code domain resource offset, a power configuration, and a beam resource of the associated information. For example, the associated information of the access mode of accessing the network device is the information about the control channel resource. The information about the control channel resource may be a control resource set. The format of the associated information of the first access mode is different from the format of the associated information of the second access mode, and time domain resources of control resource sets associated with the two access modes are different. In the first access mode, control resource sets of the first terminal device and the second terminal device are the same, and in the second access mode, control resource sets of the first terminal device and the second terminal device are independent of each other.

Case 1: The access mode of the first terminal device is indicated by using both the first indication information and the second indication information.

The first indication information is in the bit state in the first state set, the bit state of the second indication information is the third state, and the network device supports both the first terminal device and the second terminal device in accessing the network device. In addition, it may be learned from access modes of the first terminal device and the second terminal device that the first terminal device and the second terminal device share a control channel resource, which may be understood as that a control channel resource in a format the same as that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information. The first indication information is in the bit state in the first state set, the bit state of the second indication information is the third state, and the network device supports the first terminal device in accessing the network device, and does not support the second terminal device in accessing the network device. The network device indicates, based on the access status of the first terminal device, that a control channel resource of the first terminal device is a dedicated resource, which may be understood as that a control channel resource in a format different from that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information. When the bit state information of the first indication information is the bit state in the second state set, and the bit state of the second indication information is the third state, the network device does not support the first terminal device in accessing the network device, and supports the second terminal device in accessing the network device. When the bit state information of the first indication information is the bit state in the second state set, and the bit state of the second indication information is the fourth state, the network device does not support access of the first terminal device and the second terminal device. In Table 2, only an example in which the associated information is a control channel resource is used. In actual application, there is no limitation that the associated information is specific information, and the associated information may be one or more of the information about the synchronization resource, the information about the control resource set, the information about the access resource, the information about the system resource block, the information about the data channel resource, and the like. The information is not listed one by one herein. In addition, an associated format of same associated information is not specifically limited.

To describe one solution for case 1, refer to Table 2. In Table 2, the first indication information is indicated by using 1 bit, the bit state in the first state set is 1, and the bit state in the second state set is 0. Herein, 1 represents the third state, 0 represents the fourth state, N represents that access to the network device is not supported, and Y represents that access to the network device is supported.

TABLE 2

| First indication information | Second indication information | |
|---|---|---|
| 1 (Y) | 1 (Y) | The first terminal device and the second terminal device share a control channel resource |
| 1 (Y) | 0 (N) | The first terminal device uses a dedicated control channel resource |
| 0 (N) | 1 (Y) | |
| 0 (N) | 0 (N) | |

Case 2: The access mode of the first terminal device is indicated by using the first indication information.

In the following description, only an example in which the associated information is a control channel resource is used. In actual application, there is no limitation that the associated information is specific information, and the associated information may be one or more of the information about the synchronization resource, the information about the control resource set, the information about the access resource, the information about the system resource block, the information about the data channel resource, and the like. The information is not listed one by one herein. In addition, an associated format of same associated information is not specifically limited.

When the first indication information includes 1 bit, and the first indication information is in the bit state in the first state set, the network device supports the first terminal device in accessing the network device; or when the first indication information is in the bit state in the second state set, the network device does not support the first terminal device in accessing the network device. In addition, when the first indication information is in the bit state in the first state set, the network device supports the first terminal device in accessing the network device, and a shared control channel resource is used. This may be understood as that the CORESET #0 is used, or a control channel resource the same as that used by the second terminal device is used.

The first indication information includes 2 bits; and the network device supports the first terminal device in accessing the network device, the bit state of the first indication information includes the first state set and the second state set, the bit states in the first state set include {10, 11}, the second state set includes {00, 01}, the bit state in the first state set indicates that the first terminal device is supported in accessing the network device, and the bit state in the second state set indicates that the first terminal device is not supported in accessing the network device. In addition, the bit state of the first indication information may further indicate the mode to be used by the first terminal device to access the network device. The associated information of the mode of accessing the network device may be a control channel resource. For example, when the network device supports the first terminal device in accessing the network device, 10 indicates that a control channel resource of the first terminal device is a dedicated resource, which may be understood as that a control channel resource in a format different from that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information. For example, when the network device supports the first terminal device in accessing the network device, 11 indicates that a control channel resource of the first terminal device is a shared resource, which may be understood as that a control channel resource in a format the same as that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information.

Alternatively, the network device supports the first terminal device in accessing the network device, the bit state of the first indication information includes the first state set and the second state set, the bit states in the first state set include {01, 11}, the second state set includes {00, 10}, the bit state in the first state set indicates that the first terminal device is supported in accessing the network device, and the bit state in the second state set indicates that the first terminal device is not supported in accessing the network device. In addition, the bit state of the first indication information may further indicate the mode to be used by the first terminal device to access the network device. The associated information of the mode of accessing the network device may be a control channel resource. For example, when the network device supports the first terminal device in accessing the network device, 01 indicates that a control channel resource of the first terminal device is a dedicated resource, which may be understood as that a control channel resource in a format different from that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information. For example, when the network device supports the first terminal device in accessing the network device, 11 indicates that a control channel resource of the first terminal device is a shared resource, which may be understood as that a control channel resource in a format the same as that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information.

When the network device supports the first terminal device in accessing the network device, the mode to be used by the first terminal device to access the network device is more flexibly indicated. Different access modes correspond to different formats of associated information, and therefore a resource to be used to access the network device can be more flexibly indicated.

Case 3: The access mode of the first terminal device is indicated by using the second indication information.

In the following description, only an example in which the associated information is a control channel resource is used. In actual application, there is no limitation that the associated information is specific information, and the associated information may be one or more of the information about the synchronization resource, the information about the control resource set, the information about the access resource, the information about the system resource block, the information about the data channel resource, and the like. The information is not listed one by one herein. In addition, an associated format of same associated information is not limited.

When the second indication information includes 1 bit, and the second indication information is in the bit state in the first state set, the network device supports the first terminal device in accessing the network device; or when the second indication information is in the bit state in the second state set, the network device does not support the first terminal device in accessing the network device. In addition, when the second indication information is in the bit state in the first state set, the network device supports the first terminal device in accessing the network device, and a shared control channel resource is used. This may be understood as that the CORESET #0 is used, or a control channel resource the same as that used by the second terminal device is used.

The second indication information includes 2 bits; and the network device supports the first terminal device in accessing the network device, the bit state of the second indication information includes the first state set and the second state set, the bit states in the first state set include {10, 11}, the second state set includes {00, 01}, the bit state in the first state set indicates that the first terminal device is supported in accessing the network device, and the bit state in the second state set indicates that the first terminal device is not supported in accessing the network device. In addition, the bit state of the second indication information may further indicate the mode to be used by the first terminal device to access the network device. The associated information of the mode of accessing the network device may be a control channel resource. For example, when the network device supports the first terminal device in accessing the network device, 10 indicates that a control channel resource of the first terminal device is a dedicated resource, which may be understood as that a control channel resource in a format different from that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information. For example, when the network device supports the first terminal device in accessing the network device, 11 indicates that a control channel resource of the first terminal device is a shared resource, which may be understood as that a control channel resource in a format the same as that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information.

Alternatively, the network device supports the first terminal device in accessing the network device, the bit state of the second indication information includes the first state set and the second state set, the bit states in the first state set include {01, 11}, the second state set includes {00, 10}, the bit state in the first state set indicates that the first terminal device is supported in accessing the network device, and the bit state in the second state set indicates that the first terminal device is not supported in accessing the network device. In addition, the bit state of the second indication information may further indicate the mode to be used by the first terminal device to access the network device. The associated information of the mode of accessing the network device may be a control channel resource. For example, when the network device supports the first terminal device in accessing the network device, 01 indicates that a control channel resource of the first terminal device is a dedicated resource, which may be understood as that a control channel resource in a format different from that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information. For example, when the network device supports the first terminal device in accessing the network device, 11 indicates that a control channel resource of the first terminal device is a shared resource, which may be understood as that a control channel resource in a format the same as that of the second terminal device is used. The format of the associated information may be one or more of time domain position information, frequency domain position information, code domain position information, a resource index, a time domain resource offset, a frequency domain resource offset, a code domain resource offset, a power configuration, and a beam resource of the associated information.

When the network device supports the first terminal device in accessing the network device, the mode to be used by the first terminal device to access the network device is more flexibly indicated. Different access modes correspond to different formats of associated information, and therefore a resource to be used to access the network device can be more flexibly indicated.

In addition, it should be noted that the first information may alternatively directly indicate a control resource status by using a MIB, a SIB, or downlink control information. The MIB, the downlink control information, or the SIB includes a first parameter, and the first parameter is one or more of the following parameters: the information about the synchronization resource of the first terminal device, the information about the aggregation level supported by the control resource set, the information about the number of symbols of the control channel, information about a resource unit of the control channel, the information about the search space configuration, and the information about the number of repetitions of the first channel. It should be noted that the first parameter may be a pdcch-ConfigSIB1 field in the MIB, and information indicated by the pdcch-ConfigSIB1 field may be differently interpreted by the first terminal device and the second terminal device, in other words, the first parameter may include different parameters.

If the control resource is a CORESET, device performance of the first terminal device (e.g., REDCAP UE) is poorer than that of the second terminal device (e.g., legacy UE), and the first terminal device has a limited signal receiving capability. Therefore, the network device needs to send a first channel with a relatively high aggregation level, for example, a PDCCH. For the PDCCH, when quality of a downlink channel of the terminal device is relatively good or coverage of a downlink channel is relatively large, the network device may send a PDCCH with a relatively low aggregation level; or when quality of a downlink channel of the terminal device is relatively poor or coverage of a downlink channel is relatively small, the network device may send a PDCCH with a relatively high aggregation level. The first channel may be sent for a plurality of times, so that the first terminal device may demodulate the first channel. Alternatively, a maximum aggregation level supported by the CORESET and the number of repetitions of the first channel are increased, so that the first terminal device may better demodulate the first channel.

Manner 1: The Aggregation Level of the CORESET is Increased, so that the First Terminal Device May Better Demodulate the First Channel.

To enable the first terminal device to receive a communication service in the network device and demodulate the first channel, a channel with a relatively high aggregation level is required. When the network device serves the legacy UE, aggregation levels of the CORESET usually include 1, 2, 4, 8, and 16. In this application, for the network device, to provide a service for the first terminal device, the aggregation level of the CORESET in this application is greater than or equal to a first threshold. Usually, the first threshold includes 8*n, where n is a positive integer greater than or equal to 1. For example, the first threshold is 16, 32, or another value. This is not limited herein. When the first threshold is 32, performance of a downlink control channel can be better ensured.

It may be learned, based on the foregoing description, that the aggregation level of the CORESET may be obtained by dividing the number of RBs of the CORESET*the number of symbols of the CORESET by 6. It may be learned, based on the foregoing description, that to obtain a higher aggregation level of the CORESET, the number of RBs of the CORESET or the number of symbols of the CORESET may be increased, or both the number of RBs of the CORESET and the number of symbols of the CORESET may be increased. That the number of RBs of the CORESET is increased may be understood as that in the case of a specific SCS and a specific bandwidth, a larger number of RBs are configured for the first terminal device as much as possible based on a maximum number of RBs that can be configured, or a larger number of RBs that can be configured are obtained by using a smaller SCS. The number of symbols of the CORESET is greater than or equal to a second threshold. The second threshold is usually 3, 4, 6, 9, 12, or another value.

For example, when the bandwidth is 20 M, and an SCS of the PDCCH is 60 KHz, the number of symbols is 4 or 6; when the bandwidth is 10 M, and an SCS of the PDCCH is 30 KHz, the number of symbols is 4; when the bandwidth is 10 M, and an SCS of the PDCCH is 60 KHz, the number of symbols is 9; or when the bandwidth is 10 M, and an SCS of the PDCCH is 60 KHz, the number of symbols is 12. Alternatively, in brief, a symbol length is increased to 6 when the bandwidth is 20 M, and the symbol length is increased to 12 when the bandwidth is 10 M. In such a configuration, it can be ensured that there is relatively low complexity during interleaving mapping, and a better frequency domain diversity gain can be obtained. The number of symbols of the CORESET may alternatively be any value greater than a threshold, for example, 3, 4, 6, 9, or 12. In such a configuration, it can be ensured that there is relatively low complexity during interleaving mapping, and a better frequency domain diversity gain can be obtained. In actual application, SCSs of both an SSB and the PDCCH may be considered.

In some applications, the aggregation level of the CORESET may be increased in the following three cases. It should be noted that the method (including the following cases 1, 2, and 3) for increasing the aggregation level of the CORESET may be preconfigured by using higher layer signaling, for example, RRC signaling or a MAC CE, or may be predefined, for example, defined in a protocol by using a table, and then a used configuration is indicated by using signaling, or may be indicated through implicit association. Alternatively, the method for increasing the aggregation level of the CORESET may be preconfigured by using higher layer signaling, for example, RRC signaling or a MAC CE, and then indication is performed by using physical layer signaling, for example, downlink control information (DCI).

Case 1: The aggregation level of the CORESET is increased by increasing the number of symbols of the CORESET.

It should be noted that, that the network device increases the aggregation level of the CORESET by increasing the number of symbols of the CORESET may be embodied by using a table. The pdcch-ConfigSIB1 field in the MIB corresponds to Table 3 of the CORESET of the first terminal device. In Table 3, the SCS of the SSB is 30 KHz, and the SCS of the PDCCH is 30 KHz. For the bandwidth 10 M, indices (Index) 5-9 are added to indicate the first terminal device. In comparison with indices 0-4, the number of symbols of the CORESET is significantly increased. For the bandwidth 20 M, indices 14-15 are added to indicate the first terminal device. In actual application, only one or more rows in Table 3 are applied. This is not limited herein. In Table 3, the number of RBs of the CORESET and the number of symbols of the CORESET corresponding to an index 8 are respectively 24 and 8. In this case, the aggregation level of the CORESET is 32 (24*8/6). Therefore, the network device may provide a communication service for the first terminal device. Information in other rows is not listed one by one herein. In Table 3, SS/PBCH block (SSB) and CORESET multiplexing pattern represents a multiplexing pattern of the SSB and the CORESET, and Offset represents a frequency domain offset between the SSB and the CORESET.

TABLE 3

| Index | SS/PBCH block and CORESET multiplexing pattern | Number of RBs of the CORESET | Number of symbols of the CORESET | Offset |
|---|---|---|---|---|
| 0 | 1 | 24 | 3 | 0 |
| 1 | 1 | 24 | 3 | 1 |
| 2 | 1 | 24 | 3 | 2 |
| 3 | 1 | 24 | 3 | 3 |
| 4 | 1 | 24 | 3 | 4 |
| 5 | 1 | 24 | 4 | 0 |
| 6 | 1 | 24 | 4 | 2 |
| 7 | 1 | 24 | 4 | 4 |
| 8 | 1 | 24 | 8 | 0 |
| 9 | 11 | 24 | 8 | 2 |
| 10 | 1 | 48 | 1 | 12 |
| 11 | 1 | 48 | 1 | 14 |
| 12 | 1 | 48 | 2 | 12 |
| 13 | 1 | 48 | 3 | 14 |
| 14 | 1 | 48 | 4 | 12 |
| 15 | 1 | 48 | 4 | 14 |

Case 2: The aggregation level of the CORESET is increased by increasing the number of RBs of the CORESET.

In this application, it is considered that when the SCS of the PDCCH is determined, or the SCS of the PDCCH and the SCS of the SSB are determined, and the bandwidth of the first terminal device is determined, a larger number of RBs are configured as much as possible within a range of a maximum number of RBs of the CORESET. For example, when the bandwidth of the first terminal device is 10 MHz and the SCS of the PDCCH is 30 KHz, or when the bandwidth of the first terminal device is 10 MHz, the SCS of the PDCCH is 30 KHz, and the SCS of the SSB is 30 KHz, 24 RBs are configured; or when the bandwidth of the first terminal device is 20 MHz, the SCS of the PDCCH is 30 KHz, and the SCS of the SSB is 30 KHz, 48 RBs are configured.

Case 3: The aggregation level of the CORESET is increased by increasing the number of RBs of the CORESET and the number of symbols of the CORESET.

In this application, the number of RBs of the CORESET and/or the number of symbols of the CORESET are/is increased, so that the maximum aggregation level that can be supported by the CORESET is 16 or 32. When the maximum aggregation level supported by the CORESET is 16 or 32, a relatively low channel code rate can be achieved, demodulation of the PDCCH channel by the first terminal device can be improved, interference can be reduced, a signal-to-noise ratio of the control channel can be increased, and coverage of the PDCCH can be enhanced.

Manner 2: The Number of Repetitions of the First Channel is Increased, so that the First Terminal Device Better Sends or Receives the First Channel.

It should be noted that the number of repetitions of the first channel is associated with at least one of the information about the aggregation level supported by the control resource set, the information about the resource unit of the control channel, the number of symbols of the control channel, and the information about the search space configuration.

It should be noted that the method (including the following cases 1, 2, and 3) for increasing the number of repetitions of the first channel may be preconfigured by using higher layer signaling, for example, RRC signaling or a MAC CE, or may be predefined, for example, defined in a protocol by using a table, and then a used configuration is indicated by using signaling, or may be indicated through implicit association. Alternatively, the method for increasing the number of repetitions of the first channel may be preconfigured by using higher layer signaling, for example, RRC signaling or a MAC CE, and then indication is performed by using physical layer signaling, for example, DCI.

In an example, the number of repetitions of the first channel may be determined based on one or more of the maximum aggregation level supported by the CORESET, the number of RBs of the CORESET, the number of symbols, a listening opportunity of the first channel, or the number of search space (SS) sets. The number of repetitions of the first channel may be implicitly associated with one or more of the maximum aggregation level supported by the CORESET, the number of RBs of the CORESET, the number of symbols, the listening opportunity of the first channel, or the number of SS sets, or may be explicitly indicated. An explicit manner may be that the number of repetitions of the first channel is independently indicated by using explicit signaling. For example, the base station explicitly indicates the number of repetitions of the first channel by using physical layer signaling or higher layer signaling based on the foregoing information. An explicit manner may alternatively be that the number of repetitions of the first channel is added to the table. In this case, a configuration of the number of repetitions of the first channel is associated with other information in the table. Whether the network device adds the number of repetitions of the first channel through implicit association or explicit association may be indicated by using a column in the table. Values that are of the number of repetitions of the first channel and that are determined through explicit association and implicit association are consistent with each other. However, in explicit association, the number of repetitions of the first channel is embodied by using a column in the table, and in implicit association, the number of repetitions of the first channel is not directly embodied in the table.

It should be noted that the number of repetitions of the first channel is determined based on the number of search space sets per slot. A larger number of search space sets indicates a larger number of repetitions, as shown in Table 4. A larger number of search space sets per slot indicates a larger number of repetitions. This helps enhance uplink coverage or downlink coverage, or improve spectral efficiency. Alternatively, a smaller number of search space sets per slot indicates a larger number of repetitions. There are relatively few opportunities of sending the first channel. Therefore, when the number of repetitions of the first channel is increased, sending or receiving of the first channel is facilitated, and uplink coverage or downlink coverage is enhanced, or spectral efficiency is improved. For example, the number of repetitions may be any number greater than 2, and particularly may be a power of 2. For example, if the number of search space sets is n, where n is a positive integer, the number of repetitions is m; or if the number of search space sets is 2n, the number of repetitions may be 2m or m/2. The number of repetitions of the first channel may be determined based on the maximum aggregation level supported by the CORESET. For example, a higher maximum aggregation level supported by the CORESET indicates a larger number of repetitions of the first channel, or a higher maximum aggregation level supported by the CORESET indicates a smaller number of repetitions of the first channel. The number of repetitions of the first channel may be 2n, 2 raised to the power of n, 3n, or 3 raised to the power of n, where n is a positive integer. For example, if the maximum aggregation level supported by the CORESET is 32, the number of repetitions of the first channel is 4 or 8; if the maximum aggregation level supported by the CORESET is 16, the number of repetitions of the first channel is 2 or 4; or if the maximum aggregation level supported by the CORESET is 8, the number of repetitions of the first channel is 1 or 2. For example, if the maximum aggregation level supported by the CORESET is 32, the number of repetitions of the first channel is 1 or 2; if the maximum aggregation level supported by the CORESET is 16, the number of repetitions of the first channel is 2 or 4; or if the maximum aggregation level supported by the CORESET is 8, the number of repetitions of the first channel is 4 or 8.

In Table 4, O represents an offset of a start slot of an SS #0 relative to a slot 0 in a radio frame, M and Number of search space sets per slot are the number of search spaces #0 per slot, and First symbol index is a symbol position of a first search space #0. On the basis of Table 4, one row is added to Table 5 to indicate the number of repetitions of the first channel. For example, the number of repetitions of the first channel corresponding to an index 2 is m. Table 6 shows whether an association manner is implicit association or explicit association. Examples of specific meanings of parameters in Table 4 and Table 5 are not provided one by one herein. In actual application, only several rows or columns in Table 4 or Table 5 are applied. This is not specifically limited herein.

TABLE 4

| Index | O | Number of search space sets per slot | M | First symbol index |
|---|---|---|---|---|
| 0 | 0 | 1 | 1 | 0 |
| 1 | 0 | 2 | ½ | {0, if i is even} or {$N_{symbol}^{CORESET}$, if i is odd} |
| 2 | 2 | 1 | 1 | 0 |
| 3 | 2 | 2 | ½ | {0, if i is even} or {$N_{symbol}^{CORESET}$, if i is odd} |
| 4 | 5 | 1 | 1 | 0 |
| 5 | 5 | 2 | ½ | {0, if i is even} or {$N_{symbol}^{CORESET}$, if i is odd} |
| 6 | 7 | 1 | 1 | 0 |
| 7 | 7 | 2 | ½ | {0, if i is even} or {$N_{symbol}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

TABLE 5

| Index | O | Number of search space sets per slot | M | First symbol index | Number of repetitions |
|---|---|---|---|---|---|
| 0 | 0 | 1 | 1 | 0 | m |
| 1 | 0 | 2 | ½ | {0, if i is even} or {$N_{symbol}^{CORESET}$, if i is odd} | 2m or m/2 |
| 2 | 2 | 1 | 1 | 0 | m |
| 3 | 2 | 2 | ½ | {0, if i is even} or {$N_{symbol}^{CORESET}$, if i is odd} | 2m or m/2 |
| 4 | 5 | 1 | 1 | 0 | |
| 5 | 5 | 2 | ½ | {0, if i is even} or {$N_{symbol}^{CORESET}$, if i is odd} | 2m or m/2 |
| 6 | 7 | 1 | 1 | 0 | m |
| 7 | 7 | 2 | ½ | {0, if i is even} or {$N_{symbol}^{CORESET}$, if i is odd} | 2m or m/2 |
| 8 | 0 | 1 | 2 | 0 | m |
| 9 | 5 | 1 | 2 | 0 | m |
| 10 | 0 | 1 | 1 | 1 | m |
| 11 | 0 | 1 | 1 | 2 | m |
| 12 | 2 | 1 | 1 | 1 | m |
| 13 | 2 | 1 | 1 | 2 | m |
| 14 | 5 | 1 | 1 | 1 | m |
| 15 | 5 | 1 | 1 | 2 | m |

TABLE 6

| Index | O | Number of search space sets per slot | M | First symbol index | Number of repetitions | Association manner |
|---|---|---|---|---|---|---|
| 0 | 0 | 1 | 1 | 0 | m | Implicit association |
| 1 | 0 | 2 | ½ | {0, if i is even} or {$N_{symbol}^{CORESET}$, if i is odd} | 2m or m/2 | Implicit association |
| 2 | 2 | 1 | 1 | 0 | m | Implicit association |
| 3 | 2 | 2 | ½ | {0, if i is even} or {$N_{symbol}^{CORESET}$, if i is odd} | 2m or m/2 | Implicit association |
| 4 | 5 | 1 | 1 | 0 | | Implicit association |
| 5 | 5 | 2 | ½ | {0, if i is even} or {$N_{symbol}^{CORESET}$, if i is odd} | 2m or m/2 | Implicit association |
| 6 | 7 | 1 | 1 | 0 | m | Explicit association |
| 7 | 7 | 2 | ½ | {0, if i is even} or {$N_{symbol}^{CORESET}$, if i is odd} | 2m or m/2 | Explicit association |
| 8 | 0 | 1 | 2 | 0 | m | Explicit association |
| 9 | 5 | 1 | 2 | 0 | m | Explicit association |
| 10 | 0 | 1 | 1 | 1 | m | Explicit association |
| 11 | 0 | 1 | 1 | 2 | m | Explicit association |
| 12 | 2 | 1 | 1 | 1 | m | Explicit association |

TABLE 6-continued

| Index | O | Number of search space sets per slot | M | First symbol index | Number of repetitions | Association manner |
|---|---|---|---|---|---|---|
| 13 | 2 | 1 | 1 | 2 | m | Explicit association |
| 14 | 5 | 1 | 1 | 1 | m | Explicit association |
| 15 | 5 | 1 | 1 | 2 | m | Explicit association |

If the number of repetitions of the first channel is determined based on the maximum aggregation level supported by the CORESET, the number of RBs of the CORESET, and the number of symbols, one column may be added to a configuration table of the CORESET to indicate the number of repetitions, as shown in Table 7. In Table 7, SS/PBCH block (SSB) and CORESET multiplexing pattern represents a multiplexing pattern of the SSB and the CORESET, and Offset represents a frequency domain offset between the SSB and the CORESET. For example, the number of repetitions of the first channel corresponding to an index 1 is 4. Meanings of data in rows in Table 7 are not described one by one herein.

TABLE 7

| Index | SS/PBCH block and CORESET multiplexing pattern | Number of RBs of the CORESET | Number of symbols of the CORESET | Offset | Number of repetitions of the first channel |
|---|---|---|---|---|---|
| 0 | 1 | 24 | 3 | 0 | 4 |
| 1 | 1 | 24 | 3 | 1 | |
| 2 | 1 | 24 | 3 | 2 | |
| 3 | 1 | 24 | 3 | 3 | |
| 4 | 1 | 24 | 3 | 4 | |
| 10 | 1 | 48 | 1 | 12 | 2 |
| 11 | 1 | 48 | 1 | 14 | |
| 12 | 1 | 48 | 2 | 12 | |
| 13 | 1 | 48 | 3 | 14 | |

The number of repetitions of the first channel may be intuitively determined in Table 7. However, signaling overheads are inevitably increased when one column is added. To reduce the signaling overheads, the number of repetitions may be directly indicated by the network device without adding a column used to indicate the number of repetitions of the first channel. For example, for indices 0-4, the network device indicates that the number of repetitions of the first channel is 4; and for indices 10-13, the network device indicates that the number of repetitions of the first channel is 2.

Manner 3: The Number of Symbols of the CORESET and the Number of Repetitions of the First Channel are Increased, so that the First Terminal Device May Demodulate the First Channel.

For example, during execution, on the basis of Table 3, one column may be added to indicate the number of repetitions of the first channel, or the number of repetitions of the first channel may be directly indicated by the network device. Herein, the number of repetitions of the first channel may be indicated in Table 8. In Table 8, SSB and CORESET multiplexing pattern represents a multiplexing pattern of the SSB and the CORESET, and Offset represents a frequency domain offset between the SSB and the CORESET. In Table 8, the number of repetitions of the first channel corresponding to an index 8 is 2. On the basis that the aggregation level of the CORESET is 32, the number of repetitions of the first channel is added, so that the first terminal device better demodulates the first channel.

TABLE 8

| Index | SS/PBCH block and CORESET multiplexing pattern | Number of RBs of the CORESET | Number of symbols of the CORESET | Offset | Number of repetitions |
|---|---|---|---|---|---|
| 0 | 1 | 24 | 3 | 0 | 4 |
| 1 | 1 | 24 | 3 | 1 | |
| 2 | 1 | 24 | 3 | 2 | |
| 3 | 1 | 24 | 3 | 3 | |
| 4 | 1 | 24 | 3 | 4 | |
| 5 | 1 | 24 | 4 | 0 | 2 |
| 6 | 1 | 24 | 4 | 2 | |
| 7 | 1 | 24 | 4 | 4 | |
| 8 | 1 | 24 | 8 | 0 | |
| 9 | 11 | 24 | 8 | 2 | |
| 10 | 1 | 48 | 1 | 12 | 2 |
| 11 | 1 | 48 | 1 | 14 | |
| 12 | 1 | 48 | 2 | 12 | |
| 13 | 1 | 48 | 3 | 14 | |
| 14 | 1 | 48 | 4 | 12 | 1 |
| 15 | 1 | 48 | 4 | 14 | |

The network device indicates, by using different bit states, whether the first terminal device is supported in accessing the network device. That the network device supports a first terminal device in accessing the network device in this application means that the network device is capable of supporting the terminal device in accessing the network device, or the network device allows the terminal device to access the network device. The first indication information may include one or more bits. There may be one or more bit states in the first state set, and there may be one or more bit states in the second state set. The number of bits in the first state set is the same as the number of bits in the second state set. For example, if the bit state in the first state set includes 1 bit, the bit state in the second state set also includes 1 bit. Compared with the conventional technology in which indication information used to indicate the first terminal device to access the network device is not provided, the solutions provided in this application are more applicable to a load balancing requirement existing when the first terminal device accesses the network device.

Figure 3:
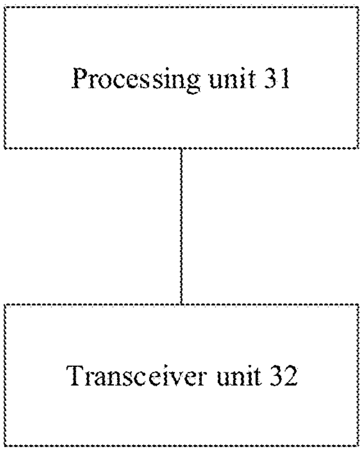
FIG. 3 is a schematic diagram of a structure of a communications apparatus according to an embodiment of this application.

Based on a same concept, an embodiment of this application provides a communications apparatus. As shown in FIG. 3, the communications apparatus includes a processing unit 31 and a transceiver unit 32.

The processing unit 31 is configured to determine first indication information. A bit state of the first indication information is a bit state in a first state set, and a network device supports a first terminal device in accessing the network device, and/or a bit state of the first information is a bit state in a second state set, and the network device does not support the first terminal device in accessing the network device. The transceiver unit 32 is configured to send first information. The first information includes the first indication information.

In a possible implementation, the first information includes a master information block sent by the network device.

In this application, the first information includes the master information block, so that the network device may send the first indication information by using the master information block.

In a possible implementation, the master information block further includes second indication information, the second indication information is cellBarred information, and the cellBarred information is not applied to the first terminal device.

When the first information includes the master information block sent by the network device, the master information block further includes the second indication information. The second indication information may be the cellBarred information, and the cellBarred information is usually not used to determine whether the network device supports access of the first terminal device.

In this application, that the second indication information is not applied to the first terminal device may be understood as that when a state of the second indication information is that access to the network device is not supported, the state is invalid for the first terminal device. Therefore, whether the network device supports the first terminal device in accessing the network device can be independently controlled.

In a possible implementation, the first information includes downlink control information or a system information block sent by the network device.

In this application, the first information includes the downlink control information or the system information block. A downlink shared channel scheduled by using the downlink control information carries the system information block, and the network device may send the first indication information by using the downlink control information or the system information block. There are a relatively large number of reserved bits, namely, available bits, in the downlink control information or the system information block, and therefore sending of the first indication information is further facilitated.

In a possible implementation, before the network device sends the first information, the method further includes: The network device sends a master information block to the first terminal device, where the master information block includes cellBarred information, and the cellBarred information is not applied to the first terminal device.

In this application, before sending the first information, the network device sends the master information block. The first information is downlink control information or a system information block. The master information block is sent before the first information is sent, the master information block includes the cellBarred information, and the cellBarred information is not applied to the first terminal device, in other words, content indicated in the cellBarred information is invalid for the first terminal device. Therefore, whether the network device supports the first terminal device in accessing the network device can be independently controlled.

In a possible implementation, the network device sends third indication information used to indicate a broadcast channel type, where a state of the third indication information is 0, and the first information is a MIB included on a broadcast channel; or a state of the third indication information is 1, and the first information is an extended information block included on a broadcast channel; and the extended information block does not include cellBarred information, and/or the extended information block includes fourth indication information.

In this application, the extended information block may be an information block dedicated to the first terminal device. The information block includes one or more bits, or includes one or more pieces of information. For example, the extended information block does not include the cellBarred information, and the extended information block includes the fourth indication information; the extended information block does not include the cellBarred information; or the extended information block includes the fourth indication information. The fourth indication information may include one or more bits. For example, the fourth indication information may include 1 bit, and the 1 bit is used as a reserved bit. Alternatively, the fourth indication information may include 1 bit, and one state represented by the 1 bit is used to indicate extension information messageClassExtension. Alternatively, the fourth indication information may include a plurality of bits, and is used to indicate a synchronization resource or a control resource set. The state 0 and the state 1 may also be used to distinguish between the two states. This is not limited. It should be noted that the third indication information is carried and sent by using a broadcast channel. In this case, the first information is the broadcast channel, and the third indication information may be 1-bit choice information.

In a possible implementation, the first indication information is indicated by using 1 bit; and the bit state of the first indication information is the bit state in the first state set, a bit state of the second indication information is a third state, and the network device supports the first terminal device in accessing the network device; or the bit state of the first indication information is the bit state in the first state set, a bit state of the second indication information is a fourth state, and the network device supports the first terminal device in accessing the network device; or the bit state of the first indication information is the bit state in the second state set, a bit state of the second indication information is a third state, and the network device does not support the first terminal device in accessing the network device; or the bit state of the first indication information is the bit state in the second state set, a bit state of the second indication information is a fourth state, and the network device does not support the first terminal device in accessing the network device, where the third state and the fourth state include 0 and 1, and the third state is different from the fourth state.

The second indication information is in the third state or the fourth state. The third state includes 0 or 1, and the fourth state includes 1 or 0. When the third state is 1, the fourth state is 0. When the third state is 0, the fourth state is 1. The bit state in the first state set and the second indication information may jointly indicate whether the network device supports access to the network device.

In this manner, an access status of the first terminal device may be more flexibly indicated. Compared with the conventional technology in which indication information used to indicate the first terminal device to access the network device is not provided, the solutions provided in this application are more applicable to a load balancing requirement existing when the first terminal device accesses the network device.

In a possible implementation, the first indication information is indicated by using 2 bits; and the network device supports the first terminal device in accessing the network device, the bit state of the first indication information includes the first state set, and the first state set includes {10, 11} or {01, 00}; or the network device does not support the first terminal device in accessing the network device, the bit state of the first indication information includes the first state set, and the first state set includes {00, 01} or {11, 10}, where the first state set indicates that the network device supports the first terminal device in accessing the network device, the second state set indicates that the network device does not support the first terminal device in accessing the network device, and the first state set is different from the second state set.

The first indication information is indicated by using 2 bits. When the first state set is {10, 11}, the second state set is {00, 01}. When the first state set is {01, 00}, the second state set is {11, 10}. The first state set indicates that the network device supports the first terminal device in accessing the network device, and the second state set indicates that the network device does not support the first terminal device in accessing the network device.

In this manner, an access status of the first terminal device may be more flexibly indicated. Compared with the conventional technology in which indication information used to indicate the first terminal device to access the network device is not provided, the solutions provided in this application are more applicable to a load balancing requirement existing when the first terminal device accesses the network device.

In a possible implementation, the bit state of the first indication information and/or the bit state of the second indication information are/is used to indicate an access mode to be used by the first terminal device to access the network device, and different access modes correspond to different formats of same associated information; and the associated information of the access mode includes one or more of the following: information about a synchronization resource, information about a control resource set, information about an access resource, information about a system information block, information about a data channel resource, information about an aggregation level supported by the control resource set, information about a control channel resource, information about the number of symbols of a control channel, information about a search space configuration, information about the number of repetitions of a first channel, information about an uplink bandwidth part, and information about a downlink bandwidth part.

It should be noted that the bit state of the first indication information and/or the bit state of the second indication information may indicate the access mode to be used by the first terminal device to access the network device, and different access modes correspond to different formats of associated information. That different access modes correspond to different formats of associated information may be understood as that the foregoing content of the same associated information is different. For example, if the associated information is the information about the control resource set, a control resource set existing when a first access mode is used to access the network device is a configured time-frequency resource CORESET #0, and a control resource set existing when a second access mode is used to access the network device is a resource set offset from a time domain of the CORESET #0. The access mode may be a shared access mode or an independent access mode, or the access mode corresponds to the associated information.

In addition, as described above, the second indication information is not applied to the first terminal device, but may be applied to a second terminal device. The first terminal device and the second terminal device have different first features. A parameter of the first feature includes at least one of the following: a bandwidth (e.g., channel bandwidth), the number of supported or configured resource units, the number of transmit antenna ports and/or the number of receive antenna ports, the number of radio frequency channels, the number of HARQ processes, a supported peak rate, an application scenario, a delay requirement, a processing capability, a protocol version, a duplex mode (a half duplex mode or a full duplex mode), and a service (an IoT application such as video surveillance or MBB).

In addition, the information about the synchronization resource includes one or more of a time domain resource position, a frequency domain resource position, a resource index, the number of resource units, a bandwidth, and a transmission period of an SSB. The first terminal device accesses the network device by using an SSB different from that used by the second terminal device, to facilitate load balancing. Alternatively, when a first feature of the first terminal device is different from a first feature of the second terminal device, for example, when a channel bandwidth supported by the first terminal device is less than that supported by the second terminal device, the first terminal device cannot access the network device by using an SSB the same as that used by the second terminal device, and in this case, a dedicated SSB is required.

The information about the control resource set includes one or more of a time domain resource position, a frequency domain resource position, a resource index, the number of resource units, and a bandwidth of the CORESET, for example, the number of resource units of a CORESET #0. In the CORESET #0, UE performs blind detection to detect a PDCCH. The PDCCH is used to schedule a PDSCH that carries a SIB 1.

The information about the access resource includes one or more of a time domain resource position, a frequency domain resource position, a resource index, the number of resource units, a bandwidth, a sequence transmission period, and a mapping relationship with an SSB of a random access resource, or includes one or more of a time domain resource position, a frequency domain resource position, a resource index, the number of resource units, and a bandwidth of an initial access resource.

The information about the system information block includes information indicating whether the system information block is shared.

The information about the data channel resource includes one or more of a time domain resource position, a frequency domain resource position, a resource index, the number of resource units, a bandwidth, and information indicating whether the data channel resource is shared, for example, information indicating that a data channel is a data channel that carries the SIB 1.

The information about the aggregation level supported by the control resource set is a CCE aggregation level supported by the control resource set. Receiving performance of the control channel can be improved if a relatively high aggregation level is supported. Different maximum aggregation levels supported by control resource sets may be configured for the first terminal device and the second terminal device.

The information about the control channel resource is associated with the channel bandwidth and/or an SCS supported by the first terminal device, and a larger number of resource units are selected as much as possible on the basis of the channel bandwidth. The number of resource units of a control channel of the first terminal device is greater than the number of resource units of a control channel of the second terminal device.

Information about the number of symbols of the control channel: The number of symbols of the control channel is associated with the aggregation level supported by the control resource set. An increase in the number of symbols of the control channel helps increase the aggregation level. The number of symbols of the control channel of the first terminal device is greater than the number of symbols of the control channel of the second terminal device.

Information about the search space configuration: A search space configuration of the control channel of the first terminal device may be different from a search space configuration of the second terminal device. For example, there are different periods of detecting a search space, different numbers of search spaces in each time unit, and different time positions of monitoring a downlink control channel in each time unit.

Information about the number of repetitions of the first channel: The number of repetitions of the first channel sent or received by the first terminal device may be explicitly or implicitly configured. Performance of the first channel may be improved if the first channel is repeated for a plurality of times, to facilitate decoding.

The information about the uplink BWP includes one or more of a time domain resource position, a frequency domain resource position, a resource index, the number of resource units, and a bandwidth of an initial uplink BWP, or includes one or more of a time domain resource position, a frequency domain resource position, a resource index, the number of resource units, and a bandwidth of an uplink active BWP.

The information about the downlink BWP includes one or more of a time domain resource position, a frequency domain resource position, a resource index, the number of resource units, and a bandwidth of an initial uplink BWP, or includes one or more of a time domain resource position, a frequency domain resource position, a resource index, the number of resource units, and a bandwidth of a downlink active BWP.

In this manner, the associated information may be indicated when it is indicated whether the first terminal device is supported in accessing the network device. Therefore, a resource to be used by the first terminal device to access the network device can be flexibly indicated.

In a possible implementation, the master information block, the downlink control information, or the system information block further includes a first parameter, and the first parameter includes one or more of the following parameters: the information about the synchronization resource of the first terminal device, the information about the aggregation level supported by the control resource set, the information about the number of symbols of the control channel, information about a resource unit of the control channel, the information about the search space configuration, and the information about the number of repetitions of the first channel.

In this application, the first parameter may be a bit in the first information, or may be an independent field in the first new message. Information indicated in the first parameter is information dedicated to the first terminal device, which helps improve performance of the first terminal device. For example, a relatively low channel code rate may be achieved, performance of decoding the downlink control channel by the first terminal device may be improved, interference may be reduced, a signal-to-noise ratio of the control channel may be increased, and coverage of the downlink control channel may be enhanced.

In a possible implementation, the aggregation level supported by the control resource set is greater than or equal to a first threshold, and the first threshold includes 8*n, where n is a positive integer greater than or equal to 1.

In this application, the aggregation level supported by the control resource set is increased in this manner, to help improve performance of the first terminal device. For example, a relatively low channel code rate may be achieved, performance of decoding the downlink control channel by the first terminal device may be improved, interference may be reduced, and a signal-to-noise ratio of the control channel may be increased.

In a possible implementation, the number of symbols in the information about the number of symbols of the control channel is greater than or equal to a second threshold, and the second threshold includes 3 or 4.

In this application, the aggregation level supported by the control resource set is increased in this manner, to help improve performance of the first terminal device. For example, a relatively low channel code rate may be achieved, performance of decoding the downlink control channel by the first terminal device may be improved, interference may be reduced, and a signal-to-noise ratio of the control channel may be increased.

In a possible implementation, the number of repetitions of the first channel is associated with at least one of the information about the aggregation level supported by the control resource set, the information about the resource unit of the control channel, the number of symbols of the control channel, and the information about the search space configuration.

In this application, the first parameter may be a bit in the first information, or may be an independent field in the first new message. Information indicated in the first parameter is information dedicated to the first terminal device, which helps improve performance of the first terminal device. For example, a relatively low channel code rate may be achieved, performance of decoding the downlink control channel by the first terminal device may be improved, interference may be reduced, a signal-to-noise ratio of the control channel may be increased, and coverage of the downlink control channel may be enhanced.

Figure 4:
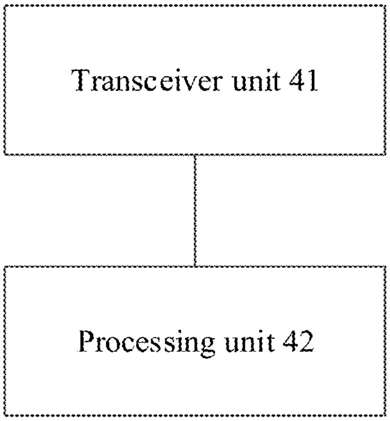
FIG. 4 is a schematic diagram of a structure of another communications apparatus according to an embodiment of this application.

An embodiment of this application provides a communications apparatus. As shown in FIG. 4, the communications apparatus includes a transceiver unit 41 and a processing unit 42.

The transceiver unit 41 is configured to obtain first information. The first information includes first indication information. The processing unit 42 is configured to demodulate the first information to obtain the first indication information. A bit state of the first indication information is a bit state in a first state set, and a network device supports a first terminal device in accessing the network device, and/or a bit state of the first information is a bit state in a second state set, and the network device does not support the first terminal device in accessing the network device.

The network device indicates, by using different bit states, whether the first terminal device is supported in accessing the network device. Compared with the conventional technology in which indication information used to indicate the first terminal device to access the network device is not provided, the solutions provided in this application are more suitable for a requirement of the first terminal device.

The network device indicates, by using different bit states, whether the first terminal device is supported in accessing the network device. That a network device supports a first terminal device in accessing the network device in this application means that the network device is capable of supporting the terminal device in accessing the network device, or the network device allows the terminal device to access the network device. The first indication information may include one or more bits. There may be one or more bit states in the first state set, and there may be one or more bit states in the second state set. The number of bits in the first state set is the same as the number of bits in the second state set. For example, if the bit state in the first state set includes 1 bit, the bit state in the second state set also includes 1 bit. Compared with the conventional technology in which indication information used to indicate the first terminal device to access the network device is not provided, the solutions provided in this application are more applicable to a load balancing requirement existing when the first terminal device accesses the network device.

In a possible implementation, the first information includes a master information block sent by the network device.

In this application, the first information includes the master information block, so that the network device may send the first indication information by using the master information block.

In a possible implementation, the master information block further includes second indication information, the second indication information is cellBarred information, and the cellBarred information is not applied to the first terminal device.

In this application, that the second indication information is not applied to the first terminal device may be understood as that when a state of the second indication information is that access to the network device is not supported, the state is invalid for the first terminal device. Therefore, whether the network device supports the first terminal device in accessing the network device can be independently controlled.

In a possible implementation, the first information includes downlink control information or a system information block sent by the network device.

In this application, the first information includes the downlink control information or the system information block. A downlink shared channel scheduled by using the downlink control information carries the system information block, and the network device may send the first indication information by using the downlink control information or the system information block. There are a relatively large number of reserved bits, namely, available bits, in the downlink control information or the system information block, and therefore sending of the first indication information is further facilitated.

In a possible implementation, the first terminal device obtains third indication information that is used to indicate a broadcast channel type and that is sent by the network device, where a state of the third indication information is 0, and the first information is a master information block included on a broadcast channel; or a state of the third indication information is 1, and the first information is an extended information block included on a broadcast channel; and the extended information block does not include cellBarred information, and/or the extended information block includes fourth indication information.

In this application, the extended information block may be an information block dedicated to the first terminal device. The information block includes one or more bits, or includes one or more pieces of information. For example, the extended information block does not include the cellBarred information, and the extended information block includes the fourth indication information; the extended information block does not include the cellBarred information; or the extended information block includes the fourth indication information. The fourth indication information may include one or more bits. For example, the fourth indication information may include 1 bit, and the 1 bit is used as a reserved bit. Alternatively, the fourth indication information may include 1 bit, and one state represented by the 1 bit is used to indicate extension information messageClassExtension. Alternatively, the fourth indication information may include a plurality of bits, and is used to indicate a synchronization resource or a control resource set. The state 0 and the state 1 may also be used to distinguish between the two states. This is not limited. It should be noted that the third indication information is carried and sent by using a broadcast channel. In this case, the first information is the broadcast channel, and the third indication information may be 1-bit choice information.

In a possible implementation, the first indication information is indicated by using 1 bit; and the bit state of the first indication information is the bit state in the first state set, a bit state of the second indication information is a third state, and the first terminal device is to access the network device; or the bit state of the first indication information is the bit state in the first state set, a bit state of the second indication information is a fourth state, and the first terminal device is to access the network device; or the bit state of the first indication information is the bit state in the second state set, a bit state of the second indication information is a third state, and the first terminal device is not to access the network device; or the bit state of the first indication information is the bit state in the second state set, a bit state of the second indication information is a fourth state, and the first terminal device is not to access the network device, where the third state and the fourth state include 0 and 1, and the third state is different from the fourth state.

In this manner, an access status of the first terminal device may be more flexibly indicated. Compared with the conventional technology in which indication information used to indicate the first terminal device to access the network device is not provided, the solutions provided in this application are more applicable to a load balancing requirement existing when the first terminal device accesses the network device.

In a possible implementation, the first indication information is indicated by using 2 bits; and the first terminal device is to access the network device, the bit state of the first indication information includes the first state set, and the first state set includes {10, 11} or {01, 00}; or the first terminal device is not to access the network device, the bit state of the first indication information includes the first state set, and the first state set includes {00, 01} or {11, 10}, where the first state set indicates that the network device supports the first terminal device in accessing the network device, the second state set indicates that the network device does not support the first terminal device in accessing the network device, and the first state set is different from the second state set.

In this manner, an access status of the first terminal device may be more flexibly indicated. Compared with the conventional technology in which indication information used to indicate the first terminal device to access the network device is not provided, the solutions provided in this application are more applicable to a load balancing requirement existing when the first terminal device accesses the network device.

In a possible implementation, the bit state of the first indication information and/or the bit state of the second indication information are/is used to indicate an access mode to be used by the first terminal device to access the network device, and different access modes correspond to different formats of same associated information; and the associated information of the access mode includes one or more of the following: information about a synchronization resource, information about a control resource set, information about an access resource, information about a system information block, information about a data channel resource, information about an aggregation level supported by the control resource set, information about a control channel resource, information about the number of symbols of a control channel, information about a search space configuration, information about the number of repetitions of a first channel, information about an uplink bandwidth part, and information about a downlink bandwidth part.

In this manner, the associated information may be indicated when it is indicated whether the first terminal device is supported in accessing the network device. Therefore, a resource to be used by the first terminal device to access the network device can be flexibly indicated.

In a possible implementation, the master information block, the downlink control information, or the system information block further includes a first parameter, and the first parameter includes one or more of the following parameters: the information about the synchronization resource of the first terminal device, the information about the aggregation level supported by the control resource set, the information about the number of symbols of the control channel, information about a resource unit of the control channel, the information about the search space configuration, and the information about the number of repetitions of the first channel.

In this application, the first parameter may be a bit in the first information, or may be an independent field in the first new message. Information indicated in the first parameter is information dedicated to the first terminal device, which helps improve performance of the first terminal device. For example, a relatively low channel code rate may be achieved, performance of decoding the downlink control channel by the first terminal device may be improved, interference may be reduced, a signal-to-noise ratio of the control channel may be increased, and coverage of the downlink control channel may be enhanced.

In a possible implementation, the aggregation level supported by the control resource set is greater than or equal to a first threshold, and the first threshold includes 8*n, where n is a positive integer greater than or equal to 1.

In this application, the aggregation level supported by the control resource set is increased in this manner, to help improve performance of the first terminal device. For example, a relatively low channel code rate may be achieved, performance of decoding the downlink control channel by the first terminal device may be improved, interference may be reduced, and a signal-to-noise ratio of the control channel may be increased.

In a possible implementation, the number of symbols in the information about the number of symbols of the control channel is greater than or equal to a second threshold, and the second threshold includes 3 or 4.

In this application, the aggregation level supported by the control resource set is increased in this manner, to help improve performance of the first terminal device. For example, a relatively low channel code rate may be achieved, performance of decoding the downlink control channel by the first terminal device may be improved, interference may be reduced, and a signal-to-noise ratio of the control channel may be increased.

In a possible implementation, the number of repetitions of the first channel is associated with at least one of the information about the aggregation level supported by the control resource set, the information about the resource unit of the control channel, the number of symbols of the control channel, and the information about the search space configuration.

In this application, the first parameter may be a bit in the first information, or may be an independent field in the first new message. Information indicated in the first parameter is information dedicated to the first terminal device, which helps improve performance of the first terminal device. For example, a relatively low channel code rate may be achieved, performance of decoding the downlink control channel by the first terminal device may be improved, interference may be reduced, a signal-to-noise ratio of the control channel may be increased, and coverage of the downlink control channel may be enhanced.

Figure 5:
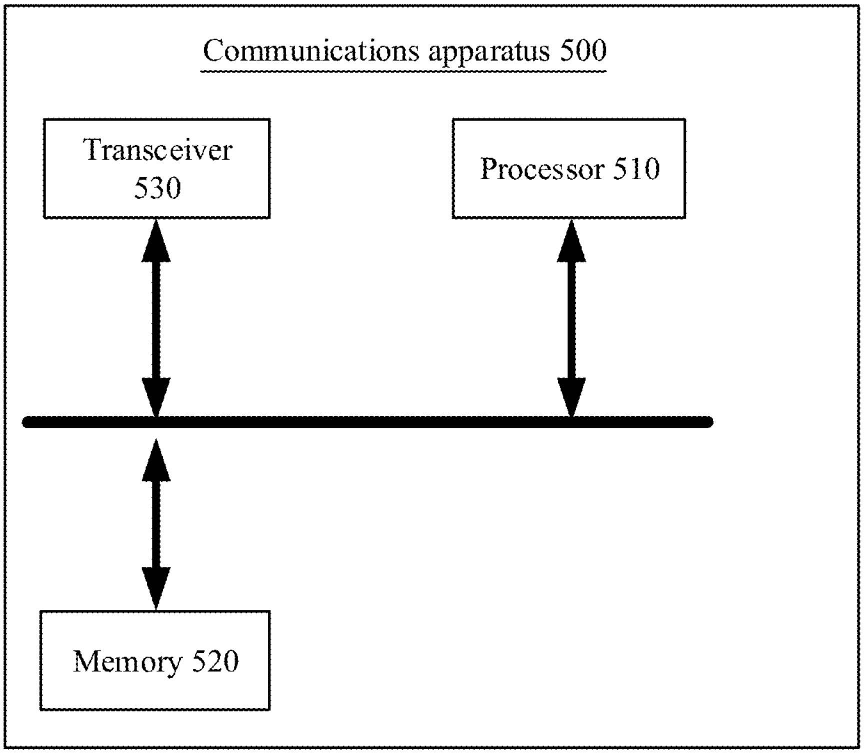
FIG. 5 is a schematic diagram of a structure of a communications apparatus according to an embodiment of this application.

Based on a same concept, FIG. 5 shows a communications apparatus 500 according to this application. For example, the communications apparatus 500 may be a chip or a chip system. Optionally, in some embodiments, the chip system may include a chip, or may include the chip and another discrete component.

The communications apparatus 500 may include at least one processor 510, and the communications apparatus 500 may further include at least one memory 520, configured to store a computer program, program instructions, and/or data. The memory 520 is coupled to the processor 510. The coupling in some embodiments is indirect coupling or a communication connection between apparatuses, units, or modules for information exchange between the apparatuses, the units, or the modules, and may be in electrical, mechanical, or other forms. The processor 510 may cooperate with the memory 520 to perform an operation. The processor 510 may execute the computer program stored in the memory 520. Optionally, the at least one memory 520 may be integrated into the processor 510.

The communications apparatus 500 may further include a transceiver 530, and the communications apparatus 500 may exchange information with another device by using the transceiver 530. The transceiver 530 may be a circuit, a bus, a transceiver, or any other apparatus that may be used to exchange information.

In a possible implementation, the communications apparatus 500 may be applied to the foregoing network device. The communications apparatus 500 may be the foregoing network device, the first terminal device, the second terminal device, or an apparatus that can support the foregoing network device in implementing any one of the foregoing embodiments. The memory 520 stores a computer program, program instructions, and/or data necessary for implementing the function of the network device in any one of the foregoing embodiments. The processor 510 may execute the computer program stored in the memory 520 to perform the method in any one of the foregoing embodiments.

A specific connection medium between the transceiver 530, the processor 510, and the memory 520 is not limited in some embodiments. In some embodiments, in FIG. 5, the memory 520, the processor 510, and the transceiver 530 are connected by using a bus. The bus is represented by using a thick line in FIG. 5. A connection manner between other components is merely an example for description, and constitutes no limitation. The bus may be classified into an address bus, a data bus, a control bus, and the like. For ease of representation, only one bold line is used for representation in FIG. 5, but this does not mean that there is only one bus or only one type of bus.

In embodiments of this application, the processor may be a general-purpose processor, a digital signal processor, an application-specific integrated circuit (ASIC), a field programmable gate array (FPGA) or another programmable logic device (PLD), a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In some embodiments, the memory may be a nonvolatile memory, for example, a hard disk drive (HDD) or a solid-state drive (SSD), or may be a volatile memory, for example, a random access memory (RAM). The memory is any other medium that can carry or store expected program code in a form of an instruction structure or a data structure and that can be accessed by a computer, but is not limited thereto. The memory in some embodiments may alternatively be a circuit or any other apparatus that can implement a storage function, and is configured to store the computer program, the program instructions and/or the data.

Figure 6:
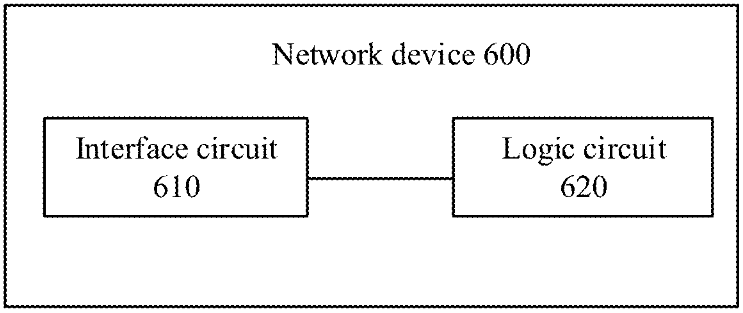
FIG. 6 is a schematic diagram of a structure of another communications apparatus according to an embodiment of this application.

Based on the foregoing embodiments, referring to FIG. 6, an embodiment of this application further provides a network device 600, including an interface circuit 610 and a logic circuit 620. The interface circuit 610 is configured to determine first indication information. A bit state of the first indication information is a bit state in a first state set, and a network device supports a first terminal device in accessing the network device, and/or a bit state of the first information is a bit state in a second state set, and the network device does not support the first terminal device in accessing the network device.

The logic circuit 620 is configured to run code instructions to perform the method in any one of the foregoing embodiments.

Figure 7:
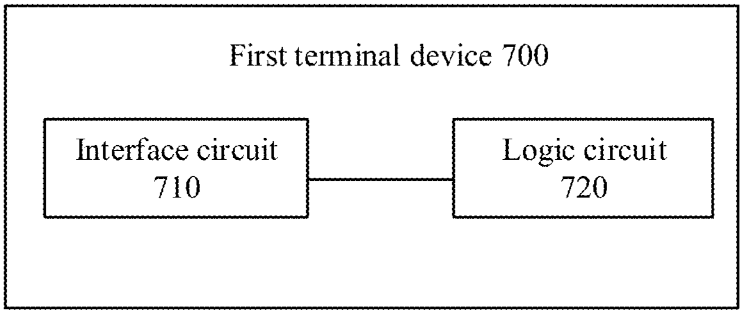
FIG. 7 is a schematic diagram of a structure of another communications apparatus according to an embodiment of this application.

Based on the foregoing embodiments, referring to FIG. 7, an embodiment of this application further provides a first terminal device 700, including an interface circuit 710 and a logic circuit 720. The interface circuit 710 is configured to: obtain first information, where the first information includes first indication information, and demodulate the first information to obtain the first indication information. A bit state of the first indication information is a bit state in a first state set, and a network device supports the first terminal device in accessing the network device, and/or a bit state of the first information is a bit state in a second state set, and the network device does not support the first terminal device in accessing the network device.

The logic circuit 720 is configured to run code instructions to perform the method in any one of the foregoing embodiments.

Based on the foregoing embodiments, an embodiment of this application further provides a readable storage medium. The readable storage medium stores instructions, and when the instructions are executed, the method performed by the security detection device in any one of the foregoing embodiments is implemented. The readable storage medium may include various media that can store program code, for example, a universal serial bus (USB) flash drive, a removable hard disk, a ROM, a RAM, a magnetic disk, or an optical disk.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the apparatus (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the block diagrams.

The computer program instructions may alternatively be stored in a computer-readable memory that can indicate a computer or another programmable data processing apparatus to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing apparatus, so that a series of operations and steps are performed on the computer or the another programmable apparatus, so that computer-implemented processing is generated. Therefore, the instructions executed on the computer or the another programmable apparatus provide steps for implementing a specific function in one or more processes in the flowcharts and/or in one or more blocks in the block diagrams.

What is claimed is:

1. A resource information indication method, comprising:

determining, by a network device, first indication information, wherein:

a bit state of the first indication information is a bit state in a first state set, and the network device supports a first terminal device in accessing the network device, or the bit state of the first indication information is a bit state in a second state set, and the network device does not support the first terminal device in accessing the network device; and sending, by the network device, first information, and the first information comprises the first indication information, wherein before the sending, by the network device, the first information, the method further comprises:

sending, by the network device, a master information block to the first terminal device, wherein the master information block comprises cellBarred information, and the cellBarred information is not applied to the first terminal device, and the method further comprises:

sending, by the network device, second indication information used to indicate a broadcast channel type, wherein:

a state of the second indication information is 0, and the first information is a master information block comprised on a broadcast channel; or the state of the second indication information is 1, and the first information is an extended information block comprised on a broadcast channel and at least one of the extended information block does not comprise cellBarred information or the extended information block comprises third indication information.

2. The method according to claim 1, wherein the first information comprises downlink control information or a system information block sent by the network device.

3. The method according to claim 1, wherein the first indication information is indicated by using 1 bit, and the method further comprises:

the bit state of the first indication information is the bit state in the first state set, a bit state of second indication information is a third state, and the network device supports the first terminal device in accessing the network device;

the bit state of the first indication information is the bit state in the first state set, the bit state of the second indication information is a fourth state, and the network device supports the first terminal device in accessing the network device;

the bit state of the first indication information is the bit state in the second state set, the bit state of the second indication information is the third state, and the network device does not support the first terminal device in accessing the network device; or the bit state of the first indication information is the bit state in the second state set, the bit state of the second indication information is the fourth state, and the network device does not support the first terminal device in accessing the network device, wherein the third state and the fourth state each comprise 0 and 1, and the third state is different from the fourth state.

4. A resource information indication method, comprising:

receiving, by a first terminal device, a master information block, wherein the master information block comprises cellBarred information, and the cellBarred information is not applied to the first terminal device;

obtaining, by the first terminal device, first information, wherein the first information comprises first indication information; and demodulating, by the first terminal device, the first information to obtain the first indication information, wherein:

a bit state of the first indication information is a bit state in a first state set, and a network device supports the first terminal device in accessing the network device, or the bit state of the first indication information is a bit state in a second state set, and the network device does not support the first terminal device in accessing the network device, and the method further comprises:

obtaining, by the first terminal device, second indication information that is used to indicate a broadcast channel type and that is sent by the network device, wherein a state of the second indication information is 0, and the first information is a master information block comprised on a broadcast channel; or the state of the second indication information is 1, and the first information is an extended information block comprised on a broadcast channel and at least one of the extended information block does not comprise cellBarred information or the extended information block comprises third indication information.

5. The method according to claim 4, wherein the first information comprises downlink control information or a system information block sent by the network device.

6. The method according to claim 4, wherein the first indication information is indicated by using 1 bit, and the method further comprises:

the bit state of the first indication information is the bit state in the first state set, a bit state of second indication information is a third state, and the first terminal device is to access the network device;

the bit state of the first indication information is the bit state in the first state set, the bit state of the second indication information is a fourth state, and the first terminal device is to access the network device;

the bit state of the first indication information is the bit state in the second state set, the bit state of the second indication information is the third state, and the first terminal device is not to access the network device; or the bit state of the first indication information is the bit state in the second state set, the bit state of the second indication information is the fourth state, and the first terminal device is not to access the network device, wherein the third state and the fourth state each comprise 0 and 1, and the third state is different from the fourth state.

7. The method according to claim 4, wherein the first indication information is indicated by using 2 bits; and the first terminal device is to access the network device, the bit state of the first indication information comprises the first state set, and the first state set comprises {10, 11} or {01, 11}; or the first terminal device is not to access the network device, the bit state of the first indication information comprises the first state set, and the first state set comprises {00, 01} or {00, 10}, wherein the first state set indicates that the network device supports the first terminal device in accessing the network device, the second state set indicates that the network device does not support the first terminal device in accessing the network device, and the first state set is different from the second state set.

8. A communications apparatus, comprising:

a processor, configured to determine first indication information, wherein:

a bit state of the first indication information is a bit state in a first state set, and the network device supports a first terminal device in accessing the network device, or the bit state of the first indication information is a bit state in a second state set, and the network device does not support the first terminal device in accessing the network device; and a transmitter, configured to send first information, and the first information comprises the first indication information, wherein before the sending the first information, the transmitter is further configured to send a master information block to the first terminal device, wherein the master information block comprises cellBarred information, and the cellBarred information is not applied to the first terminal device, and send third indication information that is used to indicate a broadcast channel type, wherein:

a state of the third indication information is 0, and the first information is a master information block comprised on a broadcast channel; or the state of the third indication information is 1, and the first information is an extended information block comprised on a broadcast channel and at least one of the extended information block does not comprise cellBarred information or the extended information block comprises third indication information.

9. The apparatus according to claim 8, wherein the first information comprises downlink control information or a system information block sent by the network device.

10. The apparatus according to claim 8, wherein the first indication information is indicated by using 1 bit, and the bit state of the first indication information is the bit state in the first state set, a bit state of second indication information is a third state, and the network device supports the first terminal device in accessing the network device;

the bit state of the first indication information is the bit state in the first state set, the bit state of the second indication information is a fourth state, and the network device supports the first terminal device in accessing the network device;

the bit state of the first indication information is the bit state in the second state set, the bit state of the second indication information is the third state, and the network device does not support the first terminal device in accessing the network device; or the bit state of the first indication information is the bit state in the second state set, the bit state of the second indication information is the fourth state, and the network device does not support the first terminal device in accessing the network device, wherein the third state and the fourth state each comprise 0 and 1, and the third state is different from the fourth state.

11. A communications apparatus, comprising a processor, wherein:

the processor is configured to:

receive a master information block, wherein the master information block comprises cellBarred information, and the cellBarred information is not applied to the apparatus;

obtain first information, wherein the first information comprises first indication information; and demodulate the first information to obtain the first indication information, wherein:

a bit state of the first indication information is a bit state in a first state set, and a network device supports the first terminal device in accessing the network device, or the bit state of the first indication information is a bit state in a second state set, and the network device does not support the first terminal device in accessing the network device, the processor is further configured to:

obtain second indication information that is used to indicate a broadcast channel type and that is sent by the network device, wherein:

a state of the second indication information is 0, and the first information is a master information block comprised on a broadcast channel; or the state of the second indication information is 1, and the first information is an extended information block comprised on a broadcast channel and at least one of the extended information block does not comprise cellBarred information or the extended information block comprises third indication information.

12. The apparatus according to claim 11, wherein the first information comprises downlink control information or a system information block sent by the network device.

13. The apparatus according to claim 11, wherein the first indication information is indicated by using 1 bit, and the bit state of the first indication information is the bit state in the first state set, a bit state of second indication information is a third state, and the first terminal device is to access the network device;

the bit state of the first indication information is the bit state in the first state set, the bit state of the second indication information is a fourth state, and the first terminal device is to access the network device;

the bit state of the first indication information is the bit state in the second state set, the bit state of the second indication information is the third state, and the first terminal device is not to access the network device; or the bit state of the first indication information is the bit state in the second state set, the bit state of the second indication information is the fourth state, and the first terminal device is not to access the network device, wherein the third state and the fourth state each comprise 0 and 1, and the third state is different from the fourth state.

14. The apparatus according to claim 11, wherein the first indication information is indicated by using 2 bits; and the first terminal device is to access the network device, the bit state of the first indication information comprises the first state set, and the first state set comprises {10, 11} or {01, 11}; or the first terminal device is not to access the network device, the bit state of the first indication information comprises the first state set, and the first state set comprises {00, 01} or {00, 10}, wherein the first state set indicates that the network device supports the first terminal device in accessing the network device, the second state set indicates that the network device does not support the first terminal device in accessing the network device, and the first state set is different from the second state set.

* * * * *